(12) United States Patent
Fujishima et al.

(10) Patent No.: US 11,863,212 B2
(45) Date of Patent: Jan. 2, 2024

(54) SIGNAL PROCESSING DEVICE AND SIGNAL PROCESSING METHOD

(71) Applicant: Panasonic Intellectual Property Management Co., Ltd., Osaka (JP)

(72) Inventors: Tomoyasu Fujishima, Kanagawa (JP); Wataru Miyashita, Tokyo (JP); Shunsuke Ikeda, Kanagawa (JP); Takayuki Hirano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 142 days.

(21) Appl. No.: 17/681,125

(22) Filed: Feb. 25, 2022

(65) Prior Publication Data

US 2022/0286150 A1  Sep. 8, 2022

(30) Foreign Application Priority Data

Feb. 26, 2021  (JP) ................................ 2021-030458

(51) Int. Cl.
  *H04B 1/10*  (2006.01)
  *H04B 1/00*  (2006.01)
  *H04B 1/04*  (2006.01)
(52) U.S. Cl.
  CPC ......... *H04B 1/0032* (2013.01); *H04B 1/0042* (2013.01); *H04B 1/0096* (2013.01); *H04B 1/0458* (2013.01); *H04B 1/0475* (2013.01)

(58) Field of Classification Search
  CPC .. H04B 1/0032; H04B 1/0042; H04B 1/0096; H04B 1/0458; H04B 1/0475
  USPC ....................................................... 455/552.1
  See application file for complete search history.

(56) References Cited

FOREIGN PATENT DOCUMENTS

JP  2015-126360 A  7/2015

*Primary Examiner* — Tanmay K Shah
(74) *Attorney, Agent, or Firm* — Seed IP Law Group LLP

(57) ABSTRACT

A signal processing device includes: a processor; and a memory having instructions. When executed by the processor, the instructions cause the signal processing device to perform operations including: converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in the frequency domain; calculating a frequency interval between the peaks of the noise in the frequency domain based on a correlation of the second signal; determining a frequency shift amount in the frequency domain based on the frequency interval; and shifting a frequency of the second signal by the frequency shift amount to create a frequency-shifted signal.

19 Claims, 38 Drawing Sheets

FIG. 28
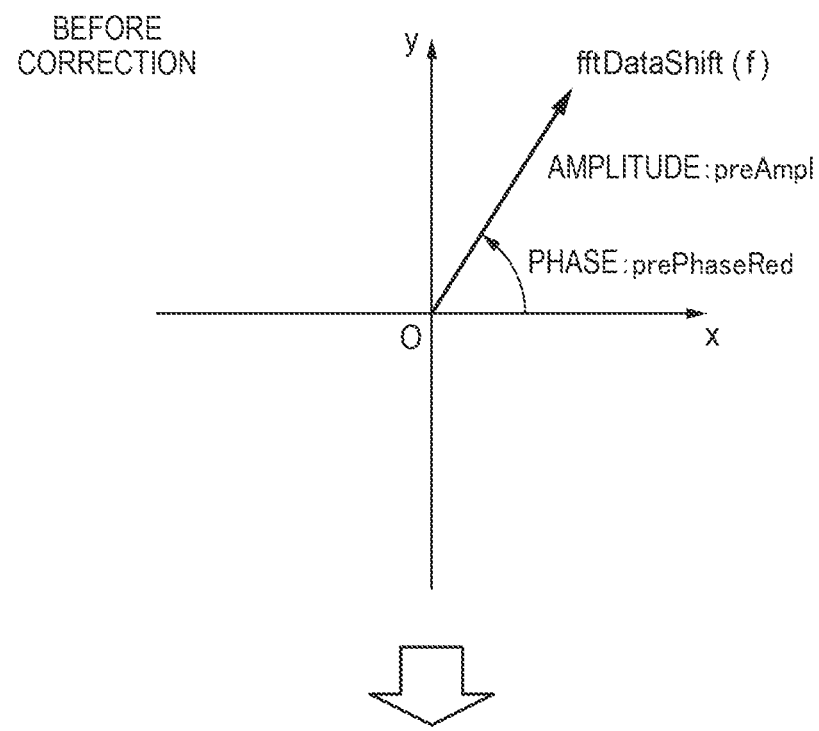
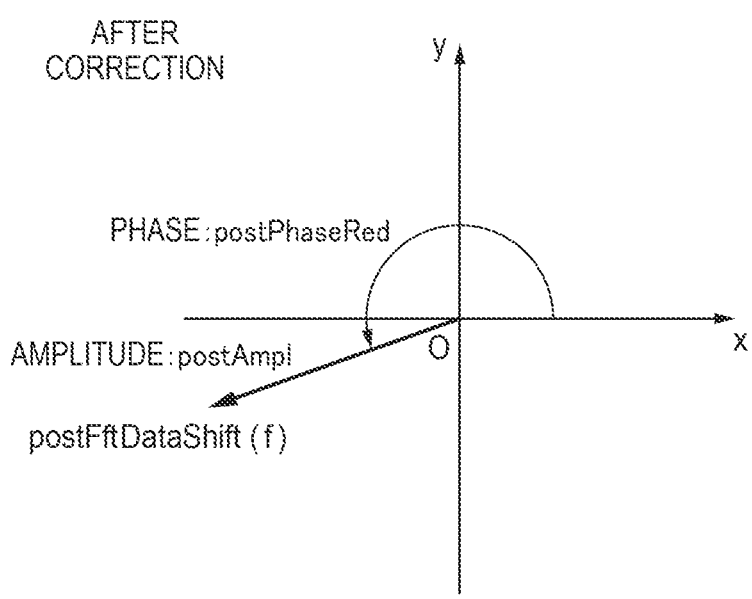

FIG. 32
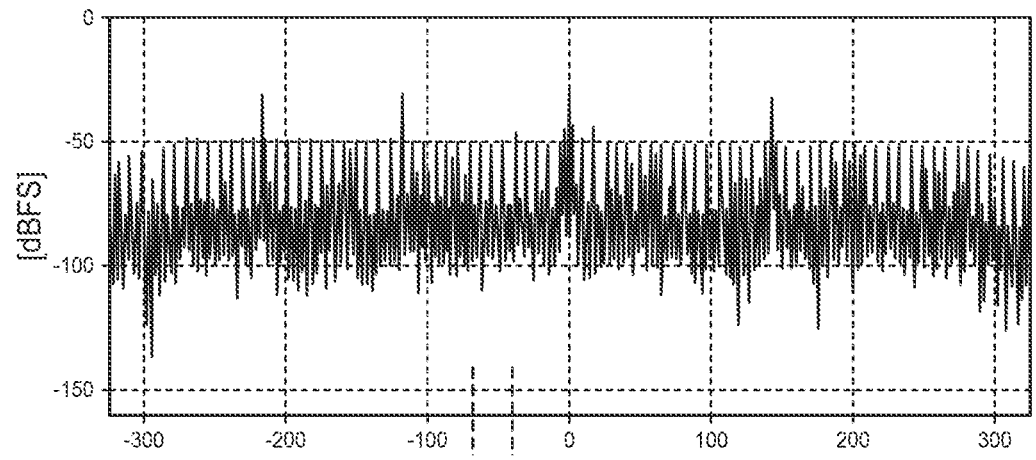
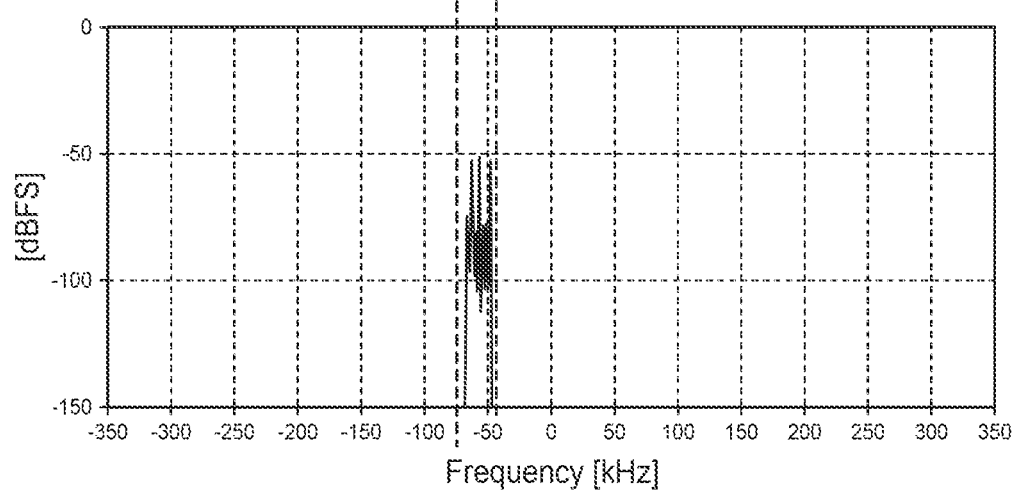
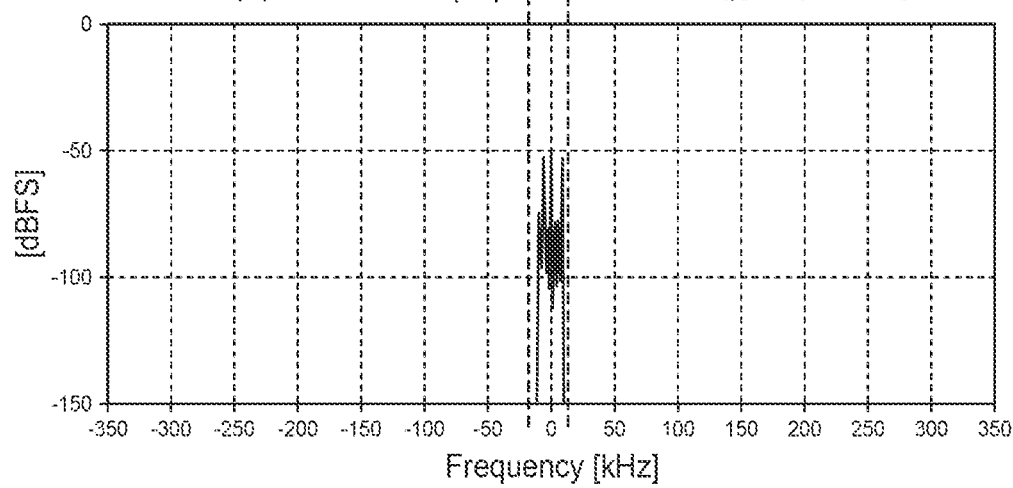

SIGNAL PROCESSING DEVICE AND SIGNAL PROCESSING METHOD

FIELD

The present disclosure relates to a signal processing device and a signal processing method.

BACKGROUND

A vehicle which drives by traction force from an electric traction motor, such as an electric vehicle (EV), a hybrid vehicle (HV) or a fuel cell vehicle (FCV), includes an inverter to generate AC (alternating current) power from a battery. The inverter mounted on the vehicle radiates electromagnetic noise. Hereinafter, the electromagnetic noise is simply referred to as noise. Therefore, the noise radiated by the inverter has a possibility to interfere with a broadcast electromagnetic wave of a radio, a television, or the like received by vehicle mounted antenna. This interference may make it difficult to appropriately extract a desired broadcast electric signal from signals received by an antenna. The noise radiated by the inverter is known to have a periodic spectrum pattern in a frequency domain. Patent Literature 1 discloses a technique of removing such noise having a periodic spectrum pattern in a frequency domain from a signal received by an antenna.
Patent Literature 1: JP-A-2015-126360

SUMMARY

However, according to the technique disclosed in Patent Literature 1, there may be cases where noise having a periodic spectrum pattern in a frequency domain cannot be appropriately removed from a signal received by an antenna.

An object of the present disclosure is to provide a technique for more appropriately removing noise having a periodic spectrum pattern in a frequency domain from a signal received by an antenna.

The present disclosure provides a signal processing device including: a processor; and a memory having instructions that, when executed by the processor, cause the signal processing device to perform operations including: converting a first signal that is a time domain signal into a second signal that is a frequency domain signal in response to reception of the first signal, the first signal containing noise superimposed on a broadcast electric signal derived from a broadcast magnetic wave, the noise having peaks of amplitude at regular frequency intervals in the frequency domain; calculating a frequency interval between the peaks of the noise in the frequency domain based on a correlation of the second signal; determining a frequency shift amount in the frequency domain based on the frequency interval; and shifting a frequency of the second signal by the frequency shift amount to create a frequency-shifted signal.

The present disclosure provides a signal processing method including: converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in a frequency domain; calculating a frequency interval between the peaks of the noise in the frequency domain based on a correlation of the second signal; determining a frequency shift amount in the frequency domain based on the frequency interval; and shifting a frequency of the second signal by the frequency shift amount.

The present disclosure provides a signal processing device including: a processor; and a memory having instructions that, when executed by the processor, cause the signal processing device to perform operations including: converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in the frequency domain; calculating a frequency interval between the peaks of the noise in the frequency domain based on a correlation of the second signal; determining a frequency shift amount in the frequency domain based on the frequency interval; extracting a signal from the second signal as a third signal in a frequency range, in a case in which the frequency of the second signal is shifted by the frequency shift amount, overlapping a frequency range of a signal of a tuned broadcast station; and shifting a frequency of the third signal by the frequency shift amount to create a frequency-shifted signal.

The present disclosure provides a signal processing method including: converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in the frequency domain; calculating a frequency interval between the peaks of the noise in the frequency domain based on a correlation of the second signal; determining a frequency shift amount in the frequency domain based on the frequency interval; extracting a signal from the second signal as a third signal in a frequency range, in a case in which the frequency of the second signal is shifted by the frequency shift amount, overlapping a frequency range of a signal of a tuned broadcast station; and shifting a frequency of the third signal by the frequency shift amount.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, the noise having a periodic spectrum pattern in the frequency domain can be more appropriately removed from the signal received by the antenna.

BRIEF DESCRIPTION OF DRAWINGS

FIG. 28 shows amplitude correction and phase correction according to Embodiment 1;

FIG. 32 shows a frequency range B2 that falls within a tuned channel frequency range after a frequency shift;

DETAILED DESCRIPTION

Hereinafter, embodiments of the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Embodiment 1

<Configuration of Vehicle>

Figure 1:
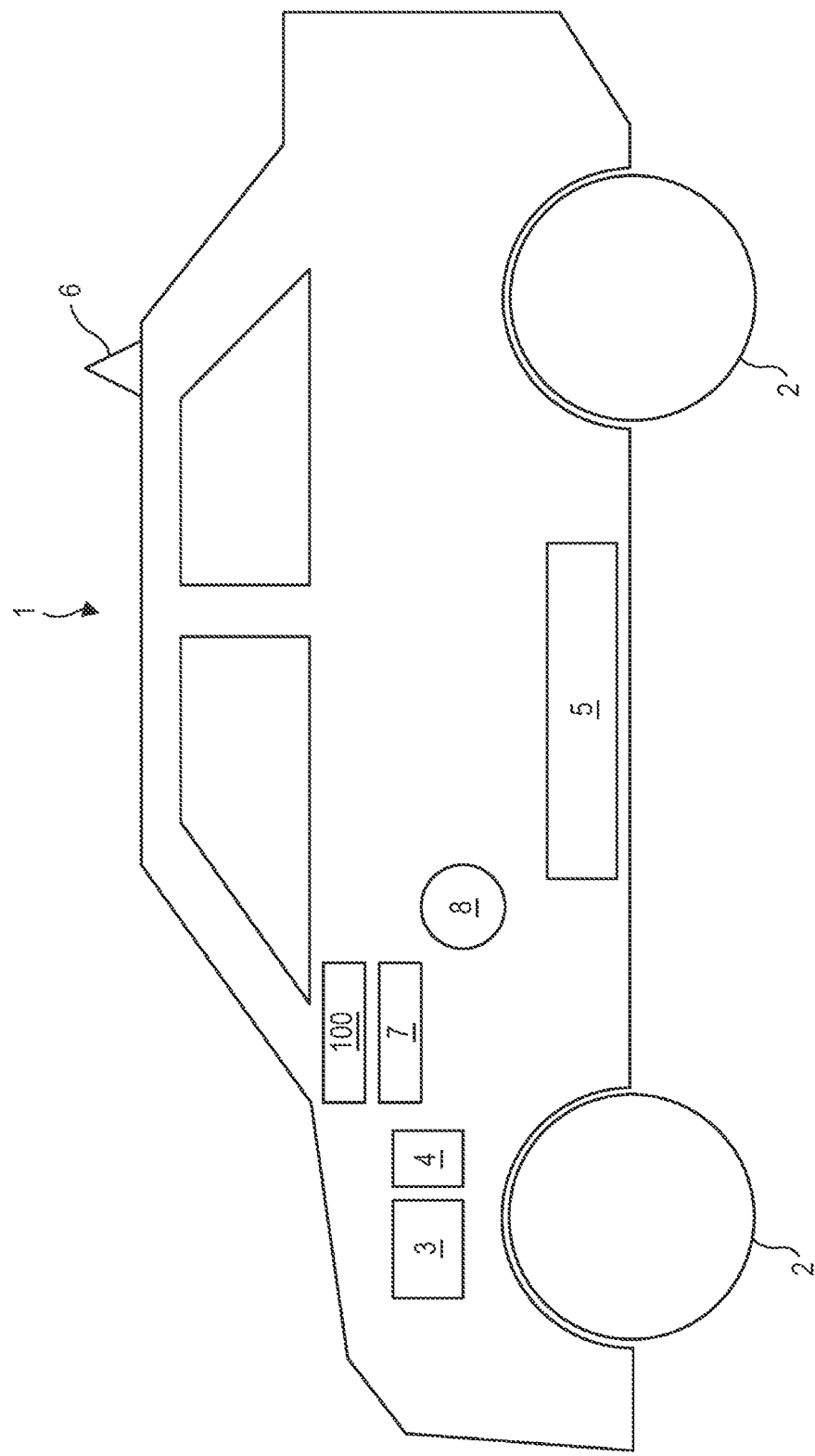
FIG. 1 shows an example of a configuration of a vehicle 1 according to Embodiment 1.

A configuration of a vehicle 1 according to Embodiment 1 will be described. FIG. 1 shows an example of the configuration of the vehicle 1 according to Embodiment 1.

The vehicle 1 includes, for example, wheels 2, a motor 3, an inverter 4, a battery 5, an antenna 6, a radio receiver 7, a speaker 8, and a signal processing device 100.

The motor 3 is driven by electric power supplied from the battery 5 so as to drive the wheels 2 of the vehicle 1.

The inverter 4 controls the electric power supplied from the battery 5 to the motor 3 so as to perform speed control and torque control of the motor 3. The inverter 4 operates at a clock frequency of, for example, 1 kHz to 10 kHz. Since the inverter 4 operates at the predetermined clock frequency, the inverter 4 can radiate noise having the clock frequency and a frequency that is an integral multiple of the clock frequency in a frequency domain. That is, the inverter 4 can radiate noise having peaks of amplitude at regular frequency intervals in the frequency domain. Here, the peak refers to a local maximum value of voltage amplitude in a waveform of a frequency spectrum in which a horizontal axis represents a frequency and a vertical axis represents voltage amplitude of each frequency. The peak may be a discrete peak shown in a line spectrum. Hereinafter, a peak of amplitude of noise appearing at regular frequency intervals in the frequency domain is referred to as a noise peak.

The inverter 4 is an example of a device that can radiate noise having a periodic spectrum pattern in the frequency domain. For example, the device capable of radiating noise having the periodic spectrum pattern in the frequency domain may also be a DC/DC converter or the like provided in the vehicle 1.

The antenna 6 receives a broadcast electromagnetic wave of an AM radio. However, the broadcast electromagnetic wave received by the antenna 6 is not limited to that of the AM radio, and may also be a broadcast electromagnetic wave of an FM radio. In addition, the broadcast electromagnetic wave received by the antenna 6 is not limited to an analog radio broadcast electromagnetic wave, and may also be a television broadcast electromagnetic wave or a digital radio broadcast electromagnetic wave. The antenna 6 can also receive the noise radiated from the inverter 4 when the broadcast electromagnetic wave is received. Hereinafter, a signal in which noise is superimposed on a broadcast electromagnetic wave, which is received by the antenna 6, is referred to as a received signal.

The signal processing device 100 removes the noise from the received signal, and outputs the signal from which the noise has been removed. Hereinafter, the signal output by the signal processing device 100 is referred to as an output signal.

The radio receiver 7 demodulates the output signal input from the signal processing device 100, and outputs a radio sound from the speaker 8. As a result, a passenger of the vehicle 1 can listen to a clear radio sound in which unpleasant noise sounds caused by the noise radiated from the inverter 4 are reduced.

Hereinafter, the signal processing device 100 will be described in detail.

<Configuration of Signal Processing Device>

Figure 2:
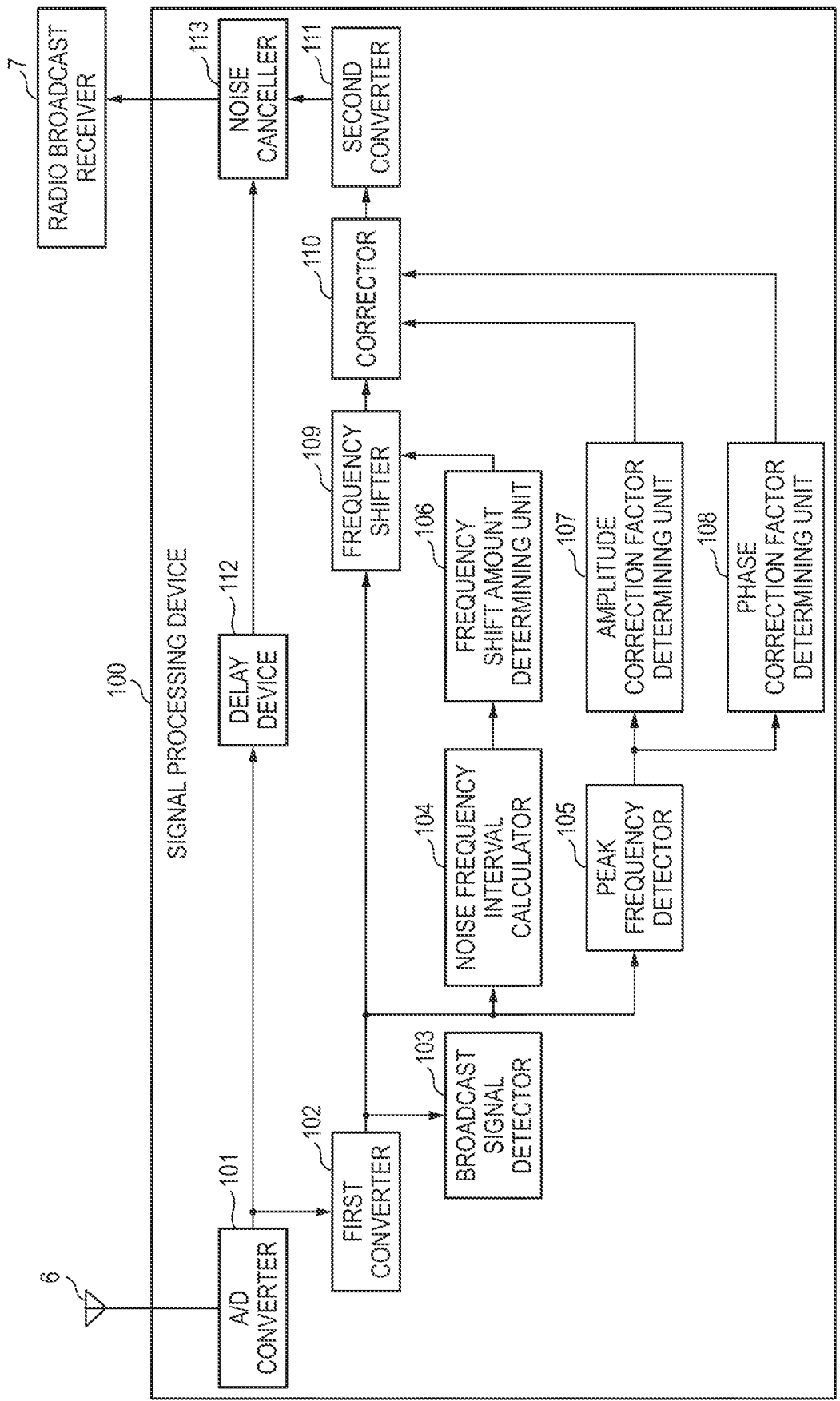
FIG. 2 is a block diagram showing an example of a configuration of a signal processing device according to Embodiment 1.
Figure 3:
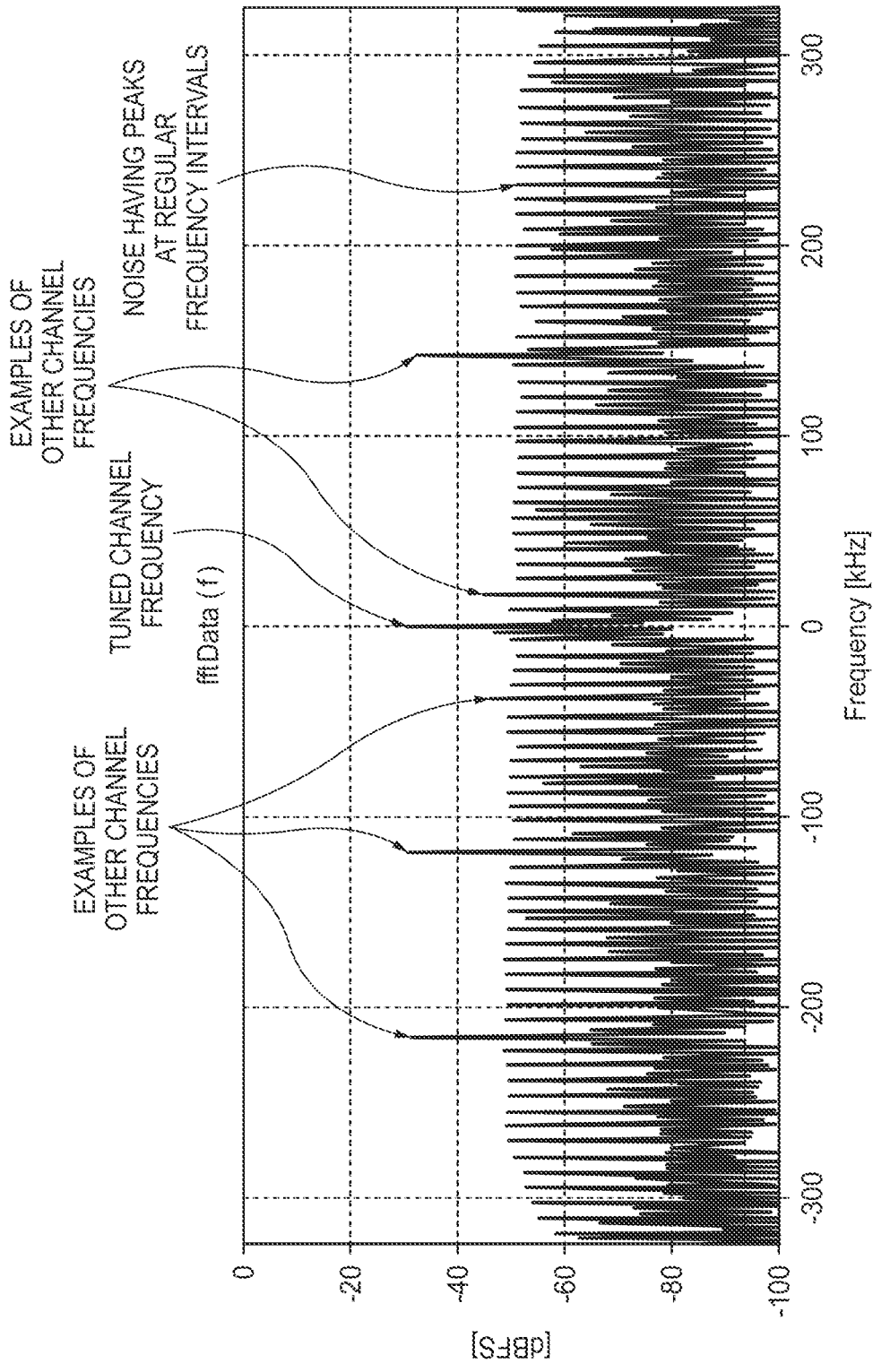
FIG. 3 shows an example of an input frequency domain signal according to Embodiment 1.

Next, a configuration of the signal processing device 100 will be described. FIG. 2 is a block diagram showing an example of the configuration of the signal processing device 100 according to Embodiment 1. FIG. 3 shows an example of an input frequency domain signal according to Embodiment 1;

The signal processing device 100 includes: an A/D converter 101; a first converter 102; a broadcast signal detector 103; a noise frequency interval calculator 104; a peak frequency detector 105; a frequency shift amount determining unit 106; an amplitude correction factor determining unit 107; a phase correction factor determining unit 108; a frequency shifter 109; a corrector 110; a second converter 111; a delay device 112; and a noise canceller 113.

The received signal is input to the A/D converter 101 from the antenna 6. The received signal may include a broadcast electric signal of a channel which is tuned by the radio receiver 7, a broadcast electric signal of a channel which is not tuned by the radio receiver 7, and the noise radiated from the inverter 4. Hereinafter, the broadcast electric signal of the tuned channel is referred to as a tuned channel broadcast signal, and the broadcast electric signal of the other channel is referred to as an other channel broadcast signal. The other channel is a channel other than the tuned channel. The A/D converter 101 converts the received signal into a digital signal. Hereinafter, a signal obtained by converting the received signal into the digital signal is referred to as an input time domain signal. The input time domain signal may also be expressed as inSig(t). Here, t represents time. The A/D converter 101 outputs inSig(t) to the first converter 102 and the delay device 112.

An RF circuit block (not shown) may be included between the antenna 6 and the A/D converter 101. The RF circuit block may include, for example, at least one of a filter configured to pass an AM broadcast electric signal with low loss and attenuate an unnecessary signal such as an FM broadcast electromagnetic wave, a low noise amplifier (LNA) configured to improve reception sensitivity, and a mixer circuit configured to perform tuning.

The first converter 102 converts a time domain signal into a frequency domain signal. The first converter 102 converts the input time domain signal inSig(t) input from the A/D converter 101 into a frequency domain signal by, for example, fast Fourier transform (FFT), as shown in FIG. 3.

Hereinafter, a signal obtained by converting the input time domain signal inSig(t) into the frequency domain signal is referred to as an input frequency domain signal. The input frequency domain signal may also be expressed as fftData (f). Here, f represents frequency. fftData(f) is a function representing a complex voltage at a certain frequency f. The first converter 102 outputs fftData(f) to the broadcast signal detector 103, the noise frequency interval calculator 104, the peak frequency detector 105, and the frequency shifter 109.

The broadcast signal detector 103 detects a frequency range that includes the tuned channel broadcast signal and a frequency range that includes the other channel broadcast signal by using the fftData(f) input from the first converter 102. Hereinafter, a frequency range including the frequency bandwidth occupied by the tuned broadcast station is referred to as a tuned channel frequency range, and a frequency range including the frequency bandwidth occupied by the other broadcast station is referred to as an other channel frequency range. The broadcast signal detector 103 generates a detection result of the tuned channel frequency range and the other channel frequency range as broadcast detection information. Hereinafter, the broadcast detection information may be expressed as detBcResult. Details of processing of the broadcast signal detector 103 will be described later.

The noise frequency interval calculator 104 calculates a noise peak frequency interval of the fftData(f) input from the first converter 102. That is, the noise frequency interval calculator 104 calculates a regular frequency interval between noise peaks of amplitude in the fftData(f). Hereinafter, the noise peak frequency interval calculated by the noise frequency interval calculator 104, that is, the regular frequency interval between the noise peaks is referred to as a noise frequency interval. The noise frequency interval may also be expressed as fcyc [Hz]. The noise frequency interval calculator 104 outputs the calculated fcyc to the frequency shift amount determining unit 106. Details of processing of the noise frequency interval calculator 104 will be described later.

The peak frequency detector 105 detects a frequency of a noise peak having maximum voltage amplitude among a plurality of frequencies having peaks in a certain frequency range of the fftData(f) input from the first converter 102. Hereinafter, the frequency detected by the peak frequency detector 105 is referred to as an extracted noise peak frequency. The extracted noise peak frequency may also be expressed as Xpeak [Hz]. The peak frequency detector 105 outputs the detected Xpeak to the amplitude correction factor determining unit 107 and the phase correction factor determining unit 108. Details of processing of the peak frequency detector 105 will be described later.

The frequency shift amount determining unit 106 determines a frequency shift amount of fftData(f) based on the broadcast detection information detBcResult input from the broadcast signal detector 103 and the noise frequency interval fcyc input from the noise frequency interval calculator 104. Hereinafter, the frequency shift amount determined by the frequency shift amount determining unit 106 may be expressed as fShift [Hz]. The frequency shift amount determining unit 106 outputs the determined fShift to the frequency shifter 109. Details of processing of the frequency shift amount determining unit 106 will be described later.

The amplitude correction factor determining unit 107 determines, by using the Xpeak input from the peak frequency detector 105, an amplitude correction factor that is a factor for correcting signal amplitude in an entire frequency range including noise peaks in the frequency domain. Hereinafter, the amplitude correction factor determined by the amplitude correction factor determining unit 107 may be expressed as GdB. GdB corresponds to an amplitude difference between two noise peaks adjacent to each other with fcyc interposed therebetween. Alternatively, GdB corresponds to a ratio of amplitude between two noise peaks adjacent to each other with fcyc interposed therebetween. The amplitude correction factor determining unit 107 outputs the determined GdB to the corrector 110. Details of processing of the amplitude correction factor determining unit 107 will be described later.

The phase correction factor determining unit 108 determines, by using the Xpeak input from the peak frequency detector 105, a phase correction factor that is a factor for correcting signal phases in the entire frequency range including noise peaks in the frequency domain. Hereinafter, the phase correction factor determined by the phase correction factor determining unit 108 may be expressed as deltaD. deltaD corresponds to a phase difference between two noise peaks adjacent to each other with fcyc interposed therebetween. The phase correction factor determining unit 108 outputs the determined deltaD to the corrector 110. Details of processing of the phase correction factor determining unit 108 will be described later.

The frequency shifter 109 shifts a frequency of the fftData(f) input from the first converter 102 by the fShift input from the frequency shift amount determining unit 106. Hereinafter, a signal obtained by shifting the frequency of the fftData(f) by the fShift by the frequency shifter 109 is referred to as a frequency-shifted frequency domain signal. The frequency-shifted frequency domain signal may also be expressed as fftDataShift(f). The frequency shifter 109 outputs fftDataShift(f) to the corrector 110. Details of processing of the frequency shifter 109 will be described later.

The corrector 110 corrects amplitude of a frequency spectrum in the entire frequency range of the fftDataShift(f) input from the frequency shifter 109 by using the GdB input from the amplitude correction factor determining unit 107. However, the corrector 110 may also not perform the correction of the amplitude. In addition, the corrector 110 corrects a phase of the frequency spectrum in the entire frequency range of the fftDataShift(f) by using the deltaD input from the phase correction factor determining unit 108. Hereinafter, a signal obtained by correcting the amplitude and the phase of the frequency spectrum in the entire frequency range of the fftDataShift(f) by the corrector 110 is referred to as a corrected frequency domain signal. The corrected frequency domain signal may also be expressed as postFftDataShift(f). The corrector 110 outputs the postFftDataShift(f) to the second converter 111. Details of processing of the corrector 110 will be described later.

The second converter 111 converts a frequency domain signal into a time domain signal. The second converter 111 converts the postFftDataShift(f) input from the corrector 110 into a time domain signal by, for example, inverse fast Fourier transform (IFFT). Hereinafter, a signal obtained by converting the postFftDataShift(f) into the time domain signal is referred to as a noise time domain signal. The noise time domain signal may also be expressed as noiseSig(t). The second converter 111 outputs noiseSig(t) to the noise canceller 113.

The delay device 112 delays the inSig(t) input from the A/D converter 101 by a predetermined time. The predetermined time may be determined based on a time from when the inSig(t) is input to the first converter 102 to when the noiseSig(t) corresponding to the inSig(t) is output from the second converter 111. The delay device 112 outputs the delayed inSig(t) to the noise canceller 113.

The noise canceller 113 performs a signal synthesis by which the noiseSig(t) input from the second converter 111 is subtracted from the inSig(t) input from the delay device 112. As a result, the noise indicated by the noiseSig(t) is removed from the entire frequency range including the tuned channel frequency range of the inSig(t). Thus an output signal is obtained by subtracting the noiseSig(t) from the inSig(t). Hereinafter, the output signal may be expressed as outSig(t). The noise canceller 113 outputs outSig(t) to the radio receiver 7. The radio receiver 7 demodulates a signal in a tuned channel frequency range of the outSig(t). As a result, the radio receiver 7 can output, from the speaker 8, the clear radio sound in which the unpleasant noise sounds caused by the noise radiated from the inverter 4 are reduced.

<Outline of Processing of Signal Processing Device>

Figure 4:
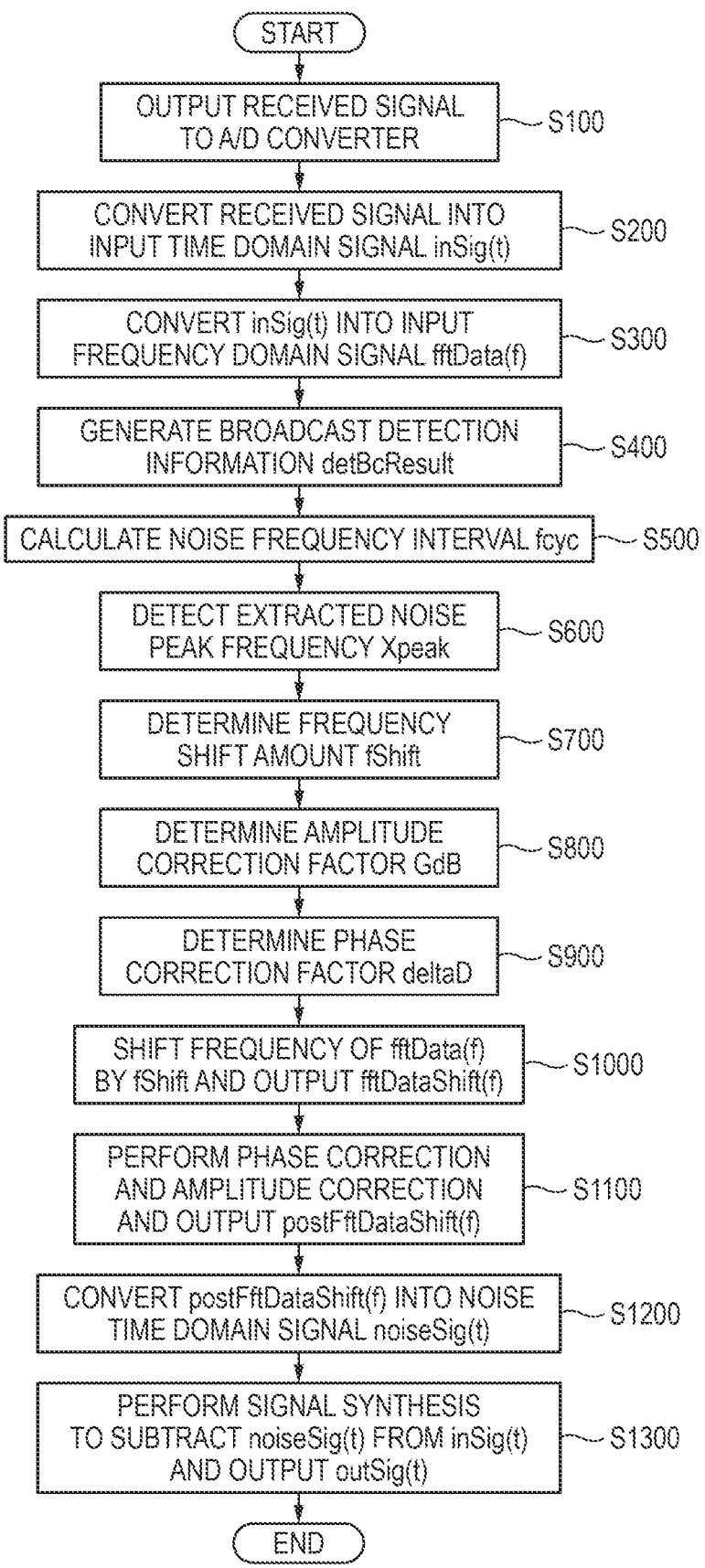
FIG. 4 is a flowchart showing an outline of processing of the signal processing device according to Embodiment 1.

Next, an outline of processing of the signal processing device 100 will be described. FIG. 4 is a flowchart showing the outline of the processing of the signal processing device 100 according to Embodiment 1.

As S100, the antenna 6 outputs the received signal to the A/D converter 101.

As S200, the A/D converter 101 converts the received signal input from the antenna 6 into the digital input time domain signal inSig(t).

At S300, the first converter 102 converts the input time domain signal inSig(t) into the input frequency domain signal fftData(f). Details of the process of S300 will be described later.

As S400, the broadcast signal detector 103 detects the tuned channel frequency range and the other channel frequency range by using the fftData(f), and generates the broadcast detection information detBcResult. Details of the process of S400 will be described later.

As S500, the noise frequency interval calculator 104 calculates the noise frequency interval fcyc in the fftData(f). Details of the process of S500 will be described later.

As S600, the peak frequency detector 105 detects the extracted noise peak frequency Xpeak in a certain frequency range of the fftData(f). Details of the process of S600 will be described later.

As S700, the frequency shift amount determining unit 106 determines the frequency shift amount fShift for the fftData (f). Details of the process of S700 will be described later.

As S800, the amplitude correction factor determining unit 107 determines the amplitude correction factor GdB. The process of S800 will be described later.

As S900, the phase correction factor determining unit 108 determines the phase correction factor deltaD. The process of S900 will be described later.

As S1000, the frequency shifter 109 shifts the frequency of the fftData(f) by the fShift determined in S700, and outputs the frequency-shifted frequency domain signal fftDataShift(f). The process of S1000 will be described later.

As S1100, the corrector 110 corrects the amplitude of the frequency spectrum in the entire frequency range of the fftDataShift(f) of S1000 by using the amplitude correction factor GdB of S800, and corrects the phase of the frequency spectrum in the entire frequency range by using the phase correction factor deltaD of S900. Then, the corrector 110 outputs the corrected frequency domain signal postFftDataShift(f) that is the signal obtained by correcting the fftDataShift(f). The process of S1100 will be described in detail later.

As S1200, the second converter 111 converts the postFftDataShift(f) of S1100 into the noise time domain signal noiseSig(t).

As S1300, the noise canceller 113 performs the signal synthesis by which the noiseSig(t) of S1200 is subtracted from the inSig(t) that is output from the A/D converter 101 and delayed by the delay device 112, and thus outputs the output signal outSig(t).

<Details of Processing of First Converter>

Next, the processing of the first converter 102 will be described in detail. That is, the process of S300 shown in FIG. 4 will be described in detail.

The first converter 102 converts the input time domain signal inSig(t) input from the A/D converter 101 into the input frequency domain signal fftData(f). An example of a waveform of the input frequency domain signal fftData(f) is shown in FIG. 3.

Here, the fftData(f) shown in FIG. 3 is a frequency spectrum in which a center frequency of a tuned channel corresponds to 0 [Hz]. As used herein, the center frequency of the tuned channel may also be referred to as a tuned channel frequency. In addition, in the present embodiment, a total signal bandwidth of fftData(f) is expressed as BWtotal, a lower limit frequency of the fftData(f) is expressed as (−BWtotal/2), and an upper limit frequency of the fftData(f) is expressed as (BWtotal/2). In addition to a tuned channel broadcast signal, the fftData(f) shown in FIG. 3 includes the other channel broadcast signal, a noise signal having peaks of amplitude at regular frequency intervals, and another lower-amplitude noise signal. The noise signal having peaks of amplitude at regular frequency intervals forms a large number of noise peaks of amplitude at regular frequency intervals over a wide frequency range. The total signal bandwidth BWtotal is wider than a bandwidth occupied by one channel of broadcast. For example, in the case of AM radio broadcasting, a bandwidth occupied by one channel varies in a range of 9 to 30 [kHz], whereas the total signal bandwidth BWtotal of the fftData(f) is, for example, 650 [kHz]. It should be noted that the total signal bandwidth BWtotal may be larger or smaller than 650 [kHz].

<Details of Processing of Broadcast Signal Detector>

Figure 5:
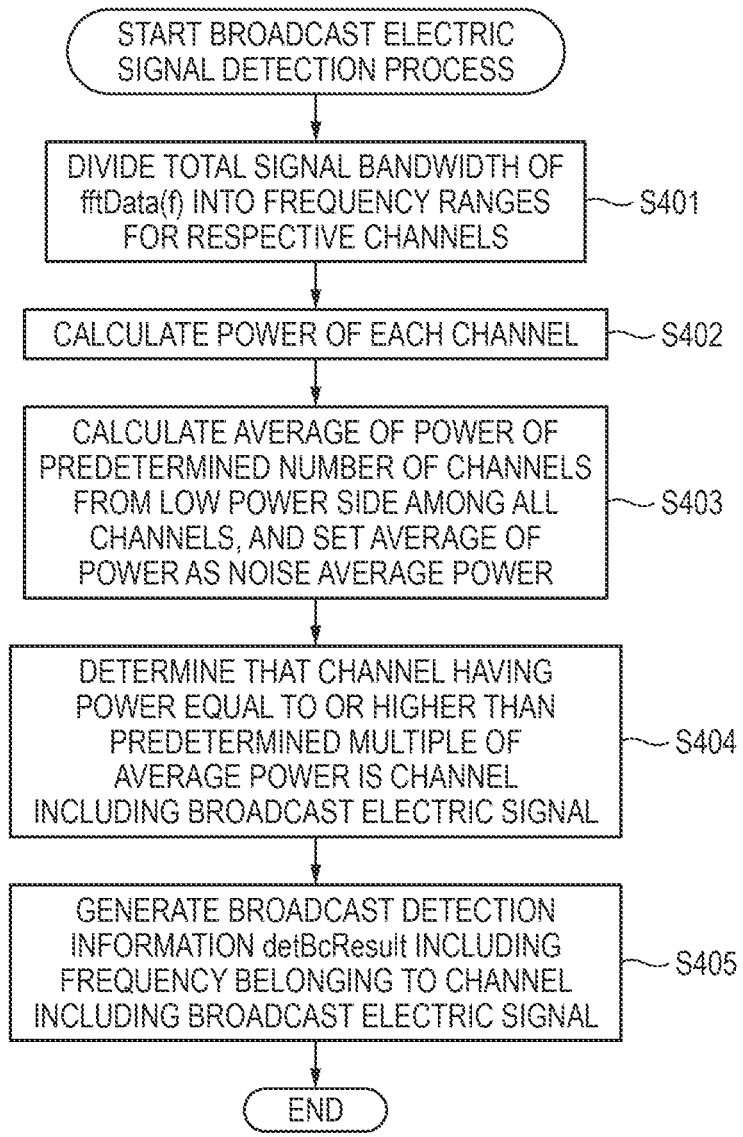
FIG. 5 is a flowchart showing an example of processing of a broadcast signal detector according to Embodiment 1.
Figure 6:
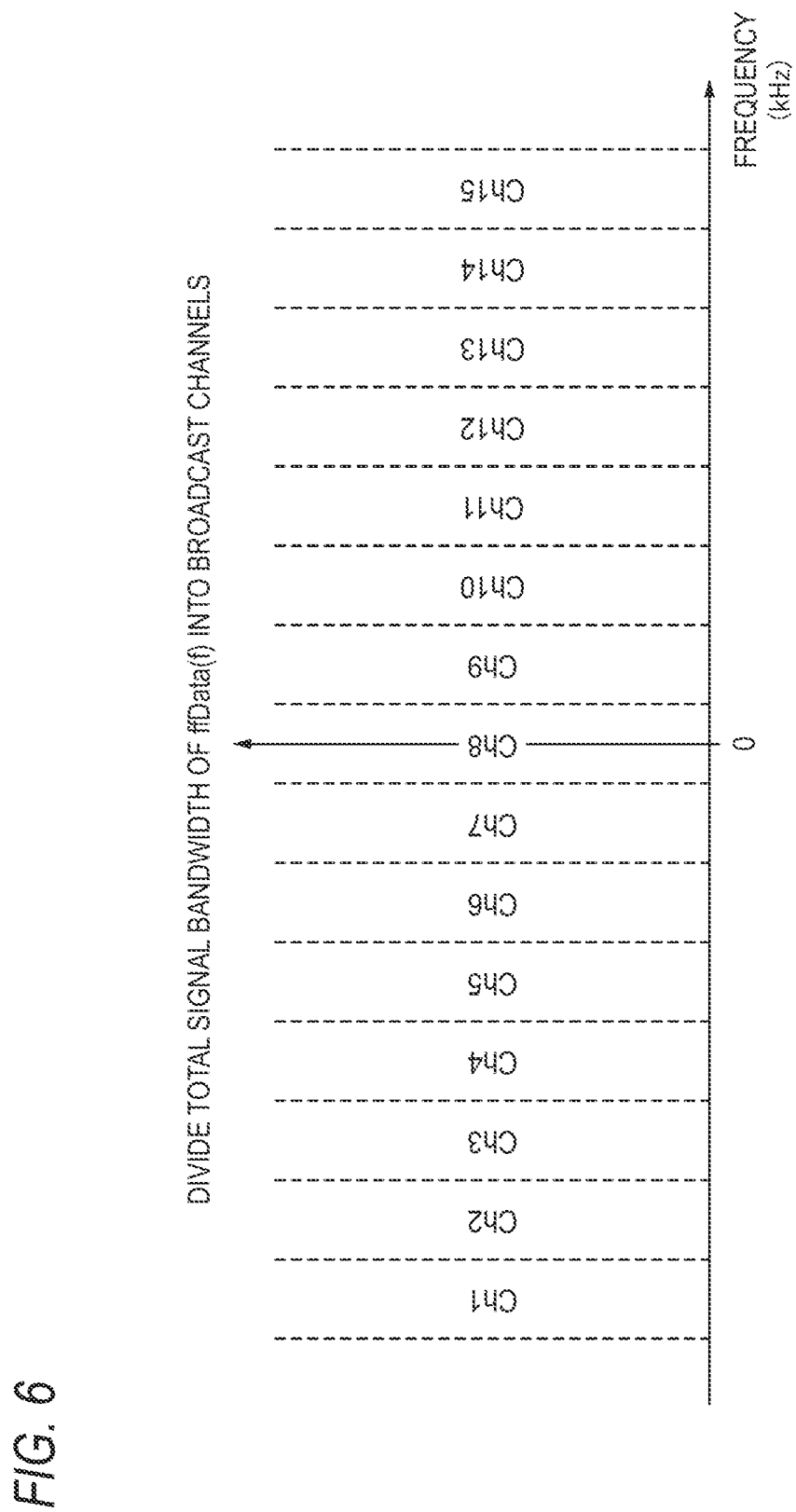
FIG. 6 shows an example in which a total signal bandwidth of the input frequency domain signal is divided into each of channels of broadcast.
Figure 7:
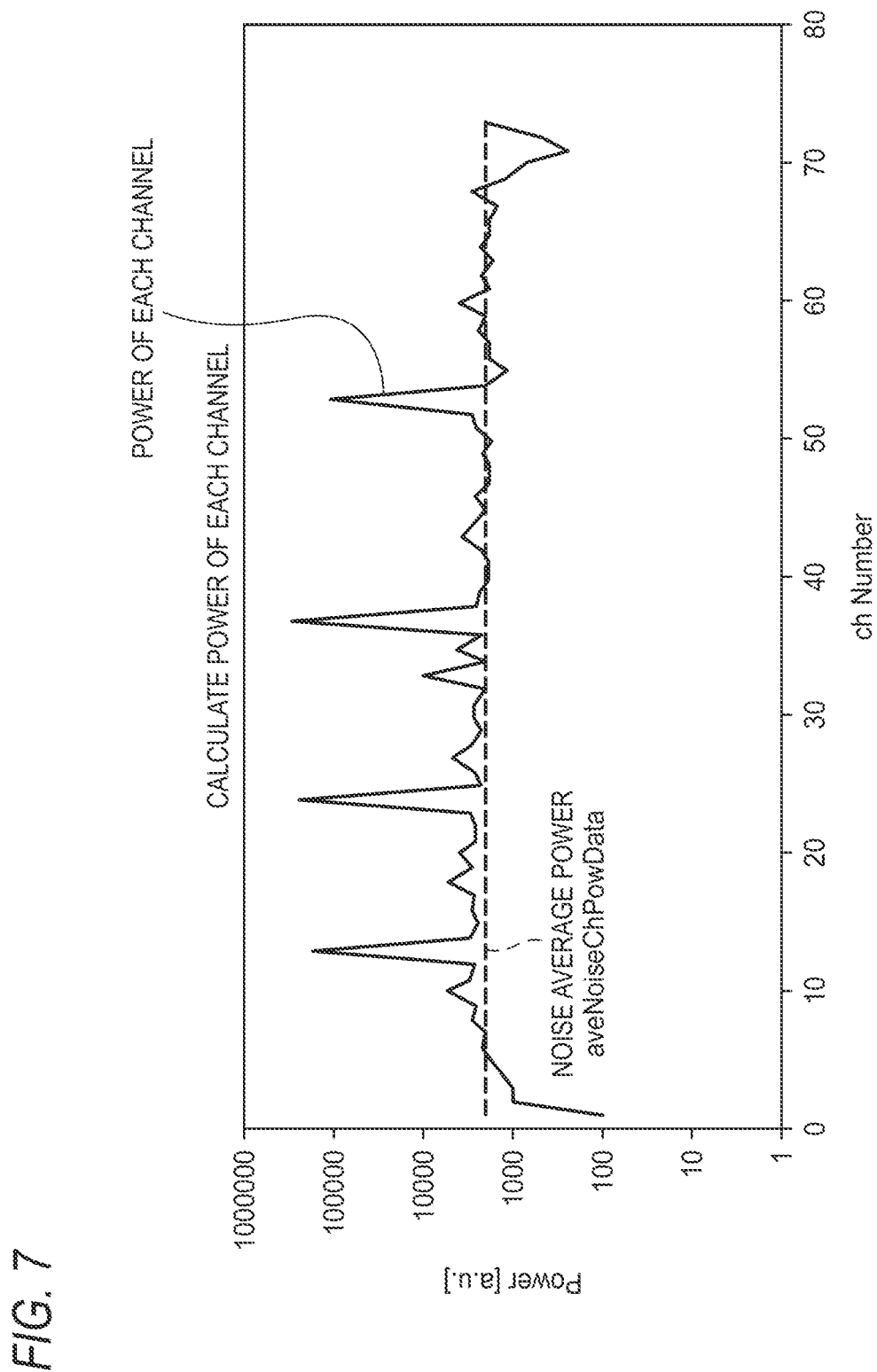
FIG. 7 shows a process of calculating a power for each channel.
Figure 8:
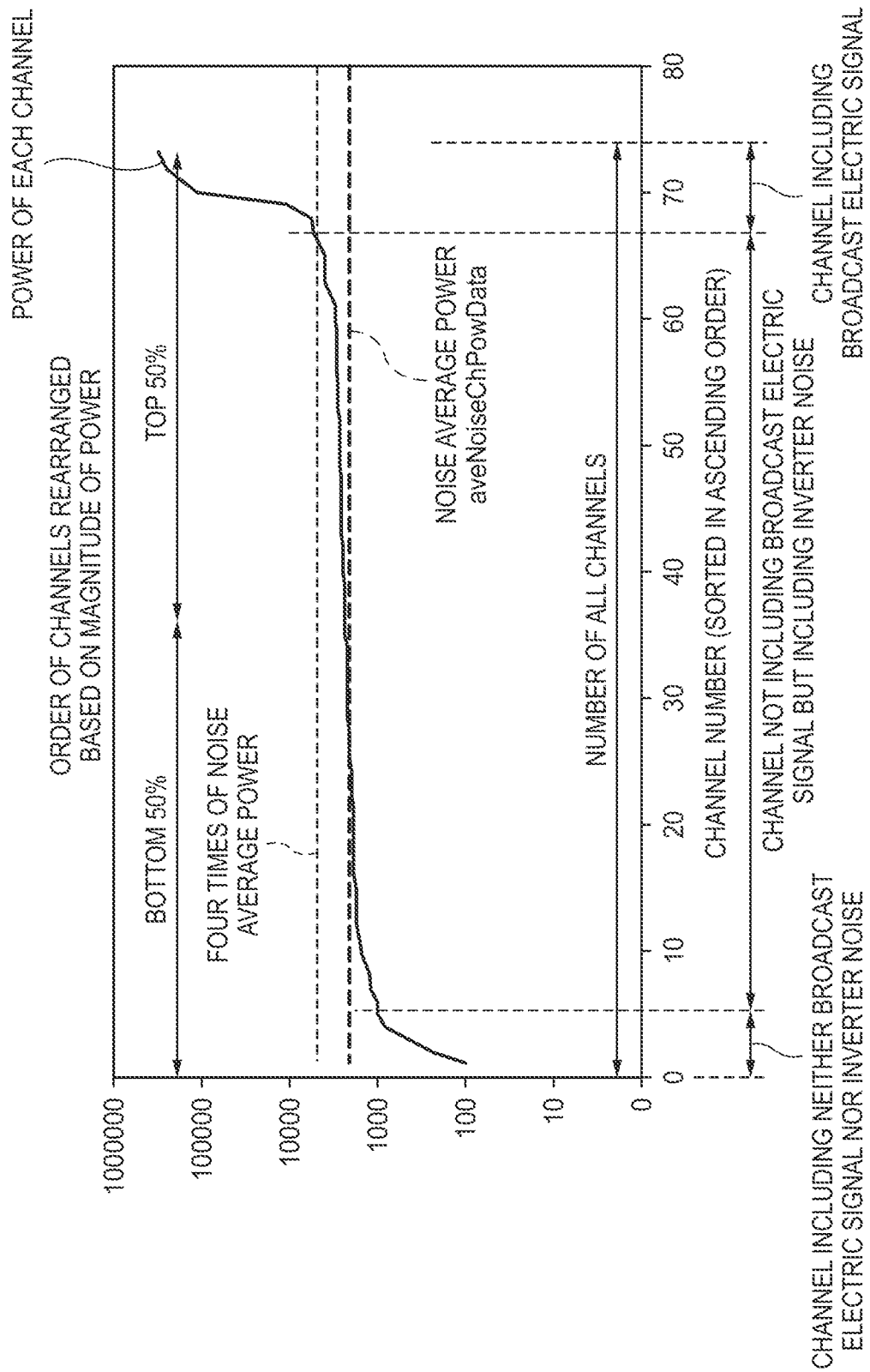
FIG. 8 shows a process of rearranging the channels based on magnitude of the power.
Figure 9:
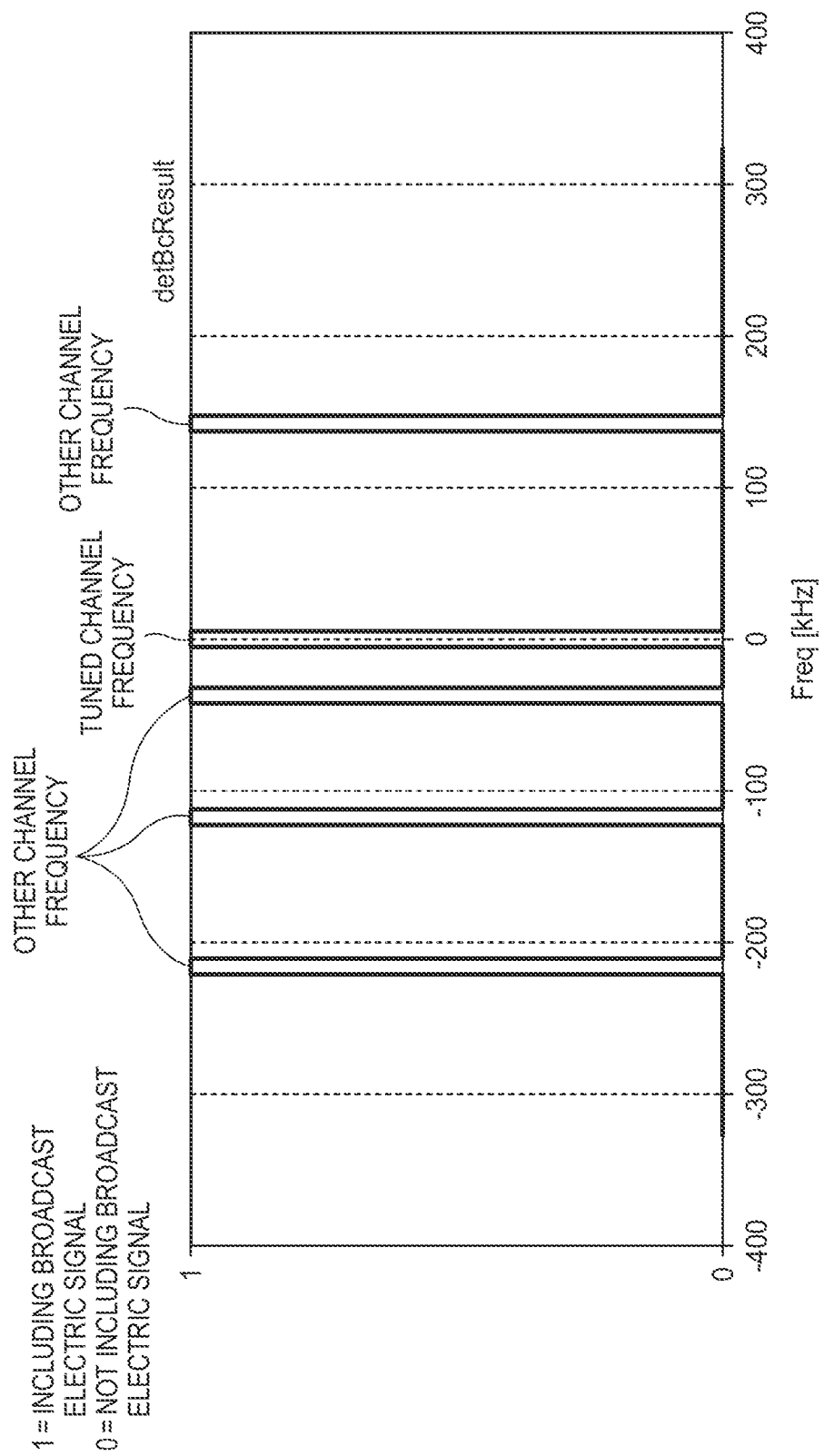
FIG. 9 shows an example of broadcast detection information.

Next, the processing of the broadcast signal detector 103 will be described in detail. That is, the process of S400 shown in FIG. 4 will be described in detail. FIG. 5 is a flowchart showing an example of the processing of the broadcast signal detector 103 according to Embodiment 1. FIG. 6 shows an example in which a total signal bandwidth of the input frequency domain signal is divided into each of the channels of broadcast. FIG. 7 shows a process of calculating a power for each channel. FIG. 8 shows a process of rearranging the channels based on magnitude of the power. FIG. 9 shows an example of the broadcast detection information (detBcResult).

As S401, as shown in FIG. 6, the broadcast signal detector 103 divides a total signal bandwidth of the fftData(f) into frequency ranges for respective broadcast channels. Hereinafter, each divided frequency range for the channels is referred to as a channel range. For example, a bandwidth of one channel range may be 9 kHz in the case of analog AM radio broadcasting in Japan, Europe, or Asia, 10 kHz in the case of analog AM radio broadcasting in North America or South America, and 30 kHz in the case of AM digital radio (IBOC) in North America.

As S402, the broadcast signal detector 103 calculates a power of each channel as shown in FIG. 7. For example, the broadcast signal detector 103 sums up squares of amplitude of signals of respective frequencies belonging to one channel range in the fftData(f) and thus calculates a channel power corresponding to the channel range.

As S403, the broadcast signal detector 103 calculates an average of power of a predetermined number of channels from a low power side among all the channels, and sets the average as a noise average power. Hereinafter, the noise average power may be expressed as aveNoiseChPowData. For example, as shown in FIG. 8, the broadcast signal detector 103 rearranges the channels in an order from a channel having a small power to a channel having a large power, calculates an average of power of a predetermined number of lower power channels, and sets the average as aveNoiseChPowData. The predetermined number may be a half of a total number of channels. However, the predetermined number is not limited to a half of the total number of channels, and may be larger or smaller than the half. In addition, when a half of the total number of channels is a decimal, the broadcast signal detector 103 may increase, decrease, or round off a decimal part thereof such that the predetermined number becomes an integer.

As S404, the broadcast signal detector 103 determines that a channel having power per channel that is equal to or higher than a predetermined multiple of the aveNoiseChPowData is a channel including the broadcast electric signal. When each process such as determination of the frequency shift amount, calculation of the amplitude correction factor, and calculation of the phase correction factor that will be described later is performed, there are cases where the calculation cannot be accurately performed if the channel including the broadcast electric signal having power larger than the predetermined multiple of the noise average power is used, and thus such a channel is identified as a channel including the broadcast electric signal. The predetermined multiple may be four times. However, the predetermined multiple is not limited to four times, and may be larger or smaller than four times. In addition, the broadcast electric signal included in the channel may be a tuned channel broadcast signal or an other channel broadcast signal. Therefore, a channel containing the tuned channel broadcast signal may be read as the tuned channel frequency range, and a channel containing the other channel broadcast signal may be read as the other channel frequency range.

As S405, the broadcast signal detector 103 determines whether each frequency of the fftData(f) belongs to the channel including the broadcast electric signal. Then, as shown in FIG. 9, the broadcast signal detector 103 generates the broadcast detection information detBcResult that includes a result of the determination. In the detBcResult shown in FIG. 9, "1" is associated with a frequency that includes the broadcast electric signal, and "0" is associated with a frequency that does not include the broadcast electric signal. Therefore, the frequency that includes the broadcast electric signal and the frequency that does not include the broadcast electric signal can be distinguished from each other by referring to the detBcResult. In other words, it is possible to identify the frequency range of any broadcast by referring to the detBcResult.

Through the above processing, the broadcast signal detector 103 can generate the broadcast detection information detBcResult.

A broadcast electromagnetic wave from the other broadcast station, which is a broadcast station other than the tuned station, may also be detected by a method different from the above-described method of detecting a broadcast electromagnetic wave from a received signal waveform. For example, a reception frequency of a radio tuner may be scanned by using the radio tuner or an external radio tuner in advance, presence or absence of the broadcast electromagnetic wave may be determined for each station, and a frequency at which the broadcast electromagnetic wave is present may be stored. Alternatively, information on a broadcast station that can be received at a position of a user may be acquired through the Internet by using position information on a location where the radio tuner is used. The location where the radio tuner is used may be, for example, a location where an antenna is mounted. Information on a frequency of the broadcast electromagnetic wave from the other broadcast station obtained from these methods that do not use the received signal waveform may be used, or these methods and the method that uses the received signal waveform described above may be used in combination.

<Details of Processing of Noise Frequency Interval Calculator>

Figure 10:
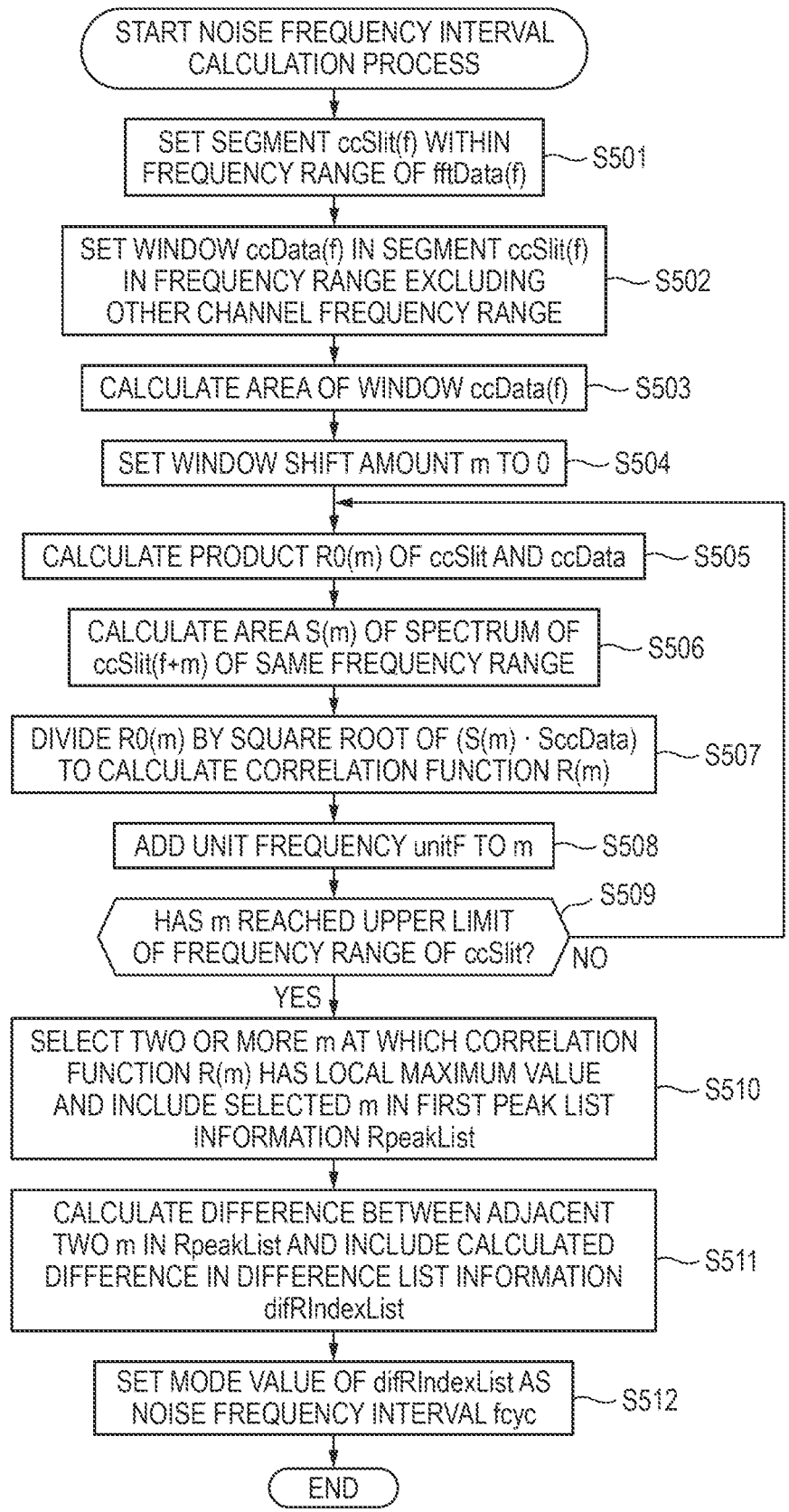
FIG. 10 is a flowchart showing an example of processing of a noise frequency interval calculator according to Embodiment 1.
Figure 11:
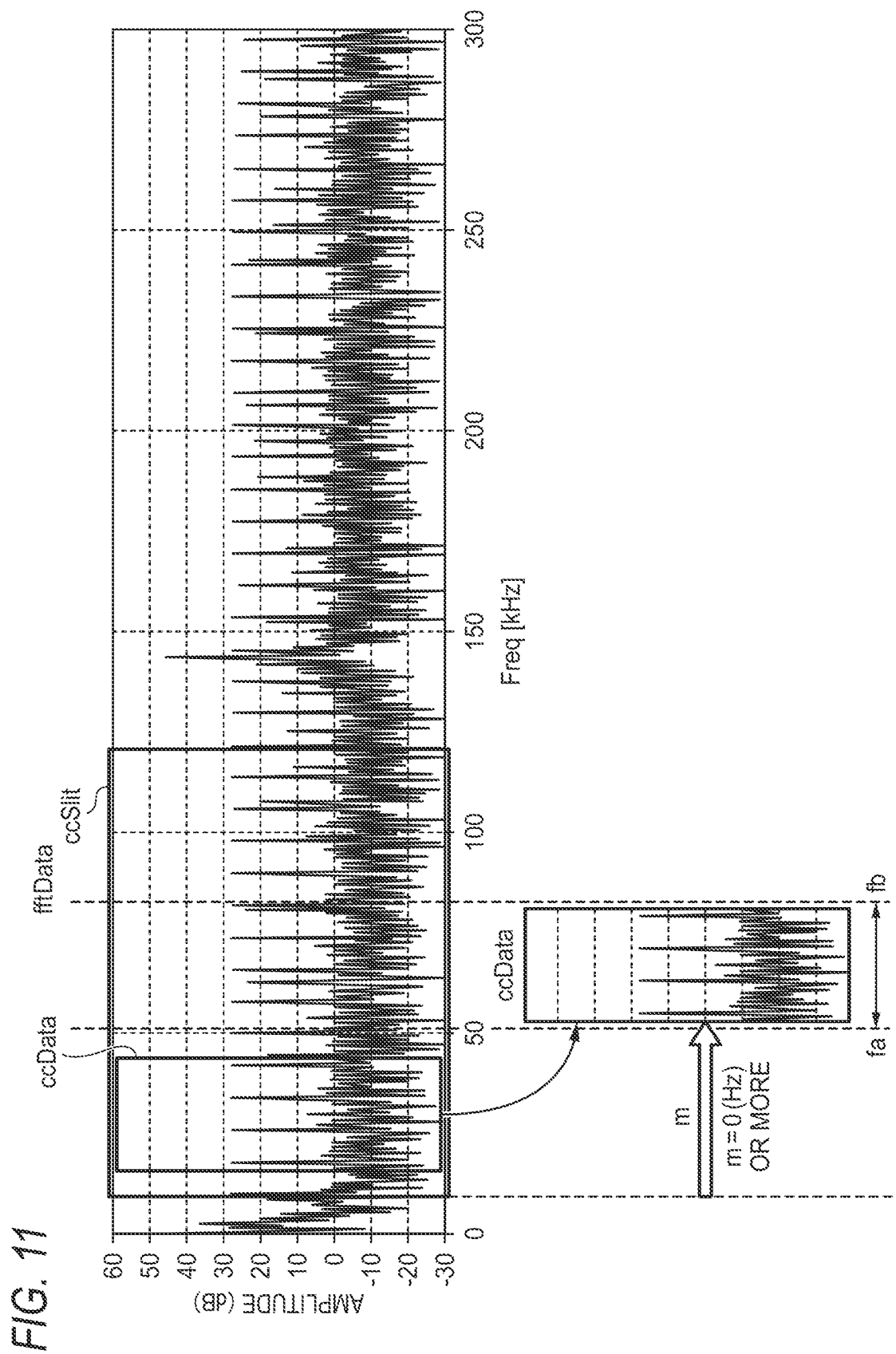
FIG. 11 shows a method of calculating a correlation function.
Figure 12:
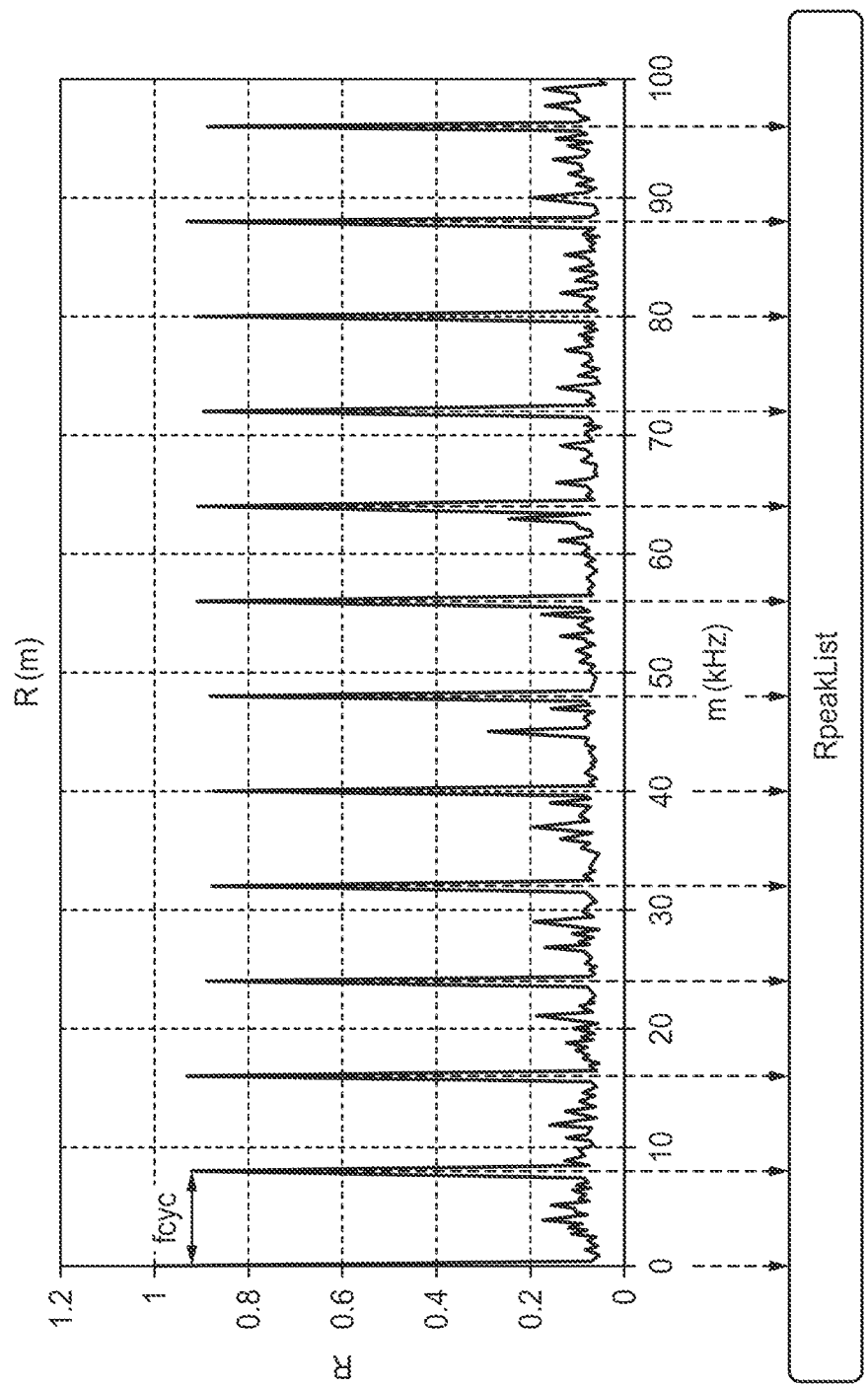
FIG. 12 shows a relationship between the correlation function and a first peak list.

Next, the processing of the noise frequency interval calculator 104 will be described in detail. That is, the process of S500 shown in FIG. 4 will be described in detail. FIG. 10 is a flowchart showing an example of the processing of the noise frequency interval calculator 104 according to Embodiment 1. FIG. 11 shows a method of calculating a correlation function. FIG. 12 shows a relationship between the correlation function and a first peak list.

As S501, the noise frequency interval calculator 104 sets a segment ccSlit(f) within a frequency range of the fftData(f) as shown in FIG. 11. The segment ccSlit(f) includes the fftData(f) in a frequency range in which the segment ccSlit (f) is set. For example, when the noise frequency interval is any frequency between 1 kHz to 10 kHz, a frequency range of the segment ccSlit(f) may be 100 kHz. However, the frequency range of the segment ccSlit(f) is not limited to 100 kHz, and may be larger or smaller than 100 kHz. The frequency range of the segment ccSlit(f) may also include the tuned channel frequency range. The frequency range of the segment ccSlit(f) may also include the other channel broadcast signal. This is because the tuned channel broadcast signal and the other channel broadcast signal do not generate any peak that has a larger amplitude than an amplitude of the noise having the periodic spectrum pattern in the frequency domain when a correlation function R(m) is calculated.

The segment ccSlit(f) may also be set in a frequency range excluding the tuned channel frequency range of the fftData (f) so as to reduce a calculation load. This is because there is a broadcast electric signal in the tuned channel frequency range, and if the noise having the periodic spectrum pattern in the frequency domain is superimposed on the broadcast electric signal in the tuned channel frequency range, there is a high possibility that peak data of the correlation function R(m) that can be used to calculate the noise frequency interval cannot be calculated. However, on the contrary, when the tuned channel frequency range is excluded, the frequency range that can be used to calculate the correlation function R(m) becomes narrow, and there are cases where a plurality of peaks of correlation functions R(m) cannot be detected. In such cases, the segment ccSlit(f) may be set as wide as possible within a frequency range in which the fftData(f) can be used, including the tuned channel frequency range.

As S502, the noise frequency interval calculator 104 sets a window ccData(f) in the segment ccSlit(f). The window ccData(f) includes the fftData(f) in a frequency range in which the window ccData(f) is set. At this time, the noise frequency interval calculator 104 refers to the broadcast detection information detBcResult and sets the window ccData(f) in a frequency range excluding the other channel frequency range. In addition, the window ccData(f) is set in a frequency range excluding the tuned channel frequency range. For example, when the noise frequency interval is any frequency between 1 kHz to 10 kHz, a frequency range of the window ccData may be 30 kHz. However, the frequency range of the window ccData is not limited to 30 kHz, and may be larger or smaller than 30 kHz.

In S503, the noise frequency interval calculator 104 calculates a square integral SccData of amplitude of each frequency of the window ccData(f) by the following Formula 1.

$$SccData = \int_{fa}^{fb} |ccData(f)|^2 df \qquad \text{(Formula 1)}$$

Here, as shown in FIG. 11, fa and fb are values indicating a lower limit frequency and an upper limit frequency of the window ccData, respectively. |A(x)| represents an absolute value of a complex number A(x). Amplitude of the complex number A(x) can be calculated as an absolute value.

As S504, the noise frequency interval calculator 104 sets 0 Hz as a window shift amount m, which is a minimum value of the window shift amount m. It should be noted that the minimum value of the window shift amount m may be larger or smaller than 0 Hz.

As S505, the noise frequency interval calculator 104 calculates an integral $R0(m)$ of a product of the amplitude of the segment ccSlit(f) of the predetermined frequency range and the amplitude of the window ccData by the following Formula 2.

$$R0(m) = \int_{fa}^{fb} |ccData(f)| \cdot |ccSlit(f+m)| df \qquad \text{(Formula 2)}$$

As S506, the noise frequency interval calculator 104 calculates a square integral S(m) of amplitude of each frequency in a segment ccSlit(f+m) of the same frequency range by the following Formula 3.

$$S(m) = \int_{fa}^{fb} |ccSlit(f+m)|^2 df \qquad \text{(Formula 3)}$$

As S507, the noise frequency interval calculator 104 calculates the correlation function R(m) by the following Formula 4. That is, the $R0(m)$ is divided by a square root of the product of the S(m) and the SccData so as to obtain the correlation function R(m). The correlation function R(m) is a correlation function on a frequency axis for amplitude of the fftData(f).

$$R(m) = R0(m)/\sqrt{S(m) \cdot SccData} \qquad \text{(Formula 4)}$$

The reason why the conversion from the $R0(m)$ to the R(m) is performed is as follows. That is, if the $R0(m)$ is directly used, a calculation result depends not only on a waveform correlation but also on magnitude of the amplitude of the ccSlit(f). Therefore, the square integral S(m) of the amplitude of the ccSlit(f) and the square integral SccData(f) of the amplitude of the ccData(f) are calculated, and the $R0(m)$ is normalized by Formula 4.

As S508, the noise frequency interval calculator 104 adds a unit frequency of the frequency axis of the input frequency domain signal fftData(f) to the window shift amount m. The unit frequency of the frequency axis of the input frequency domain signal fftData(f) may be expressed as unitF. The unitF is a very small value as compared with the total signal bandwidth BWtotal of the input frequency domain signal fftData(f), and is, for example, 10 [Hz]. However, the unitF may also be a value larger than 10 [Hz] or a value smaller than 10 [Hz].

As S509, the noise frequency interval calculator 104 determines whether the window shift amount m has reached an upper limit of the frequency range of the segment ccSlit(f).

When it is determined that the window shift amount m has reached the upper limit of the frequency range of the segment ccSlit(f) (S509: YES), the noise frequency interval calculator 104 proceeds to the process of S510.

When it is determined that the window shift amount m does not reach the upper limit of the frequency range of the segment ccSlit(f) (S509: NO), the noise frequency interval calculator 104 returns to the process of S505.

By the processing of S505 to S509, as shown in FIG. 12, it is possible to obtain the correlation function R(m) that emphasizes the periodic spectrum pattern of the noise peak as compared with a spectrum of the original segment ccSlit (f).

As S510, the noise frequency interval calculator 104 selects at least two window shift amounts m at which the correlation function R(m) has a local maximum value, as shown in FIG. 12. The noise frequency interval calculator 104 includes the selected window shift amounts m in the first peak list information. Hereinafter, the first peak list information may be referred to as RpeakList. For example, the noise frequency interval calculator 104 selects at least two, preferably six or more window shift amounts m at which the correlation function R(m) has a local maximum value. The number of selected window shift amounts m may be changed according to the number of window shift amounts m at which the correlation function R(m) has a local maximum value. This is because, if the number of window shift amounts m at which the correlation function R(m) has a local maximum value is large while the number of selected window shift amounts m is small, there is a high possibility that an erroneous noise frequency interval fcyc is calculated. In addition, the noise frequency interval calculator 104 may select a window shift amount m at which R(m) is equal to or higher than a predetermined threshold value. As a result, a local maximum value that is not originated from periodic noise peaks can be excluded. The predetermined threshold value may be 0.5. However, the predetermined threshold value may be larger or smaller than 0.5.

As S511, the noise frequency interval calculator 104 calculates a difference between two window shift amounts m adjacent to each other in the RpeakList. The noise frequency interval calculator 104 includes the calculated difference in difference list information. Hereinafter, the difference list information may be expressed as difRIndexList.

As S512, the noise frequency interval calculator 104 sets a value that appears most frequently in the difRIndexList, that is, a mode value, as the noise frequency interval fcyc. For example, when 8.013 kHz is the mode value in the difRIndexList, the noise frequency interval calculator 104 sets fcyc=8.013 kHz.

Through the above processing, the noise frequency interval calculator 104 can calculate the noise frequency interval fcyc. Although R0(m) is calculated by using the amplitude (that is, the absolute values) of the ccData(f) and the ccSlit(f) in Formula 2 in the above example, the same calculation may be performed by using a square (that is, a power) of the amplitude instead of the amplitude. In this case, in Formula 4, the correlation function R(m) can be calculated by setting R(m)=R0(m)/(S(m) SccData) without processing the square root on a right side. By this processing, the noise frequency interval fcyc can still be calculated in the same manner as described above.

<Details of Processing of Peak Frequency Detector>

Figure 13:
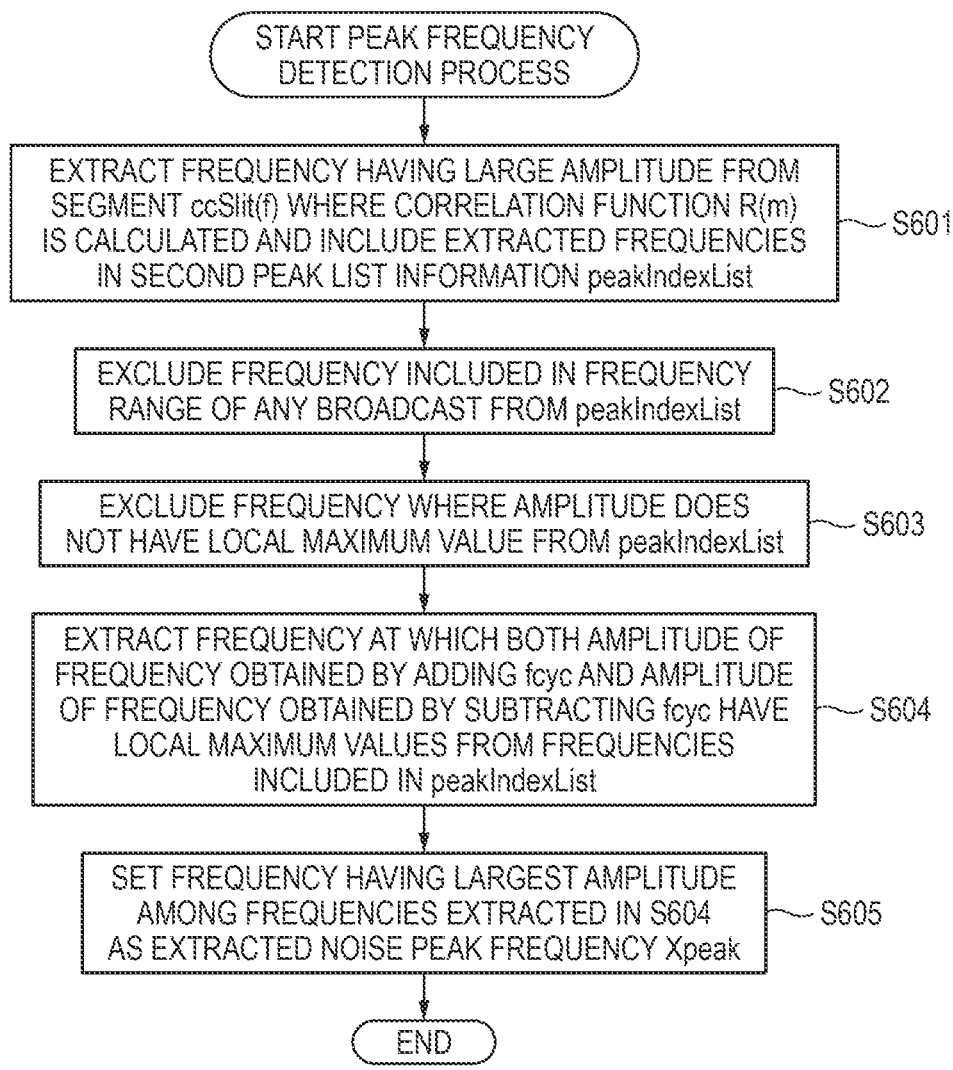
FIG. 13 is a flowchart showing an example of processing of a peak frequency detector according to Embodiment 1.
Figure 14:
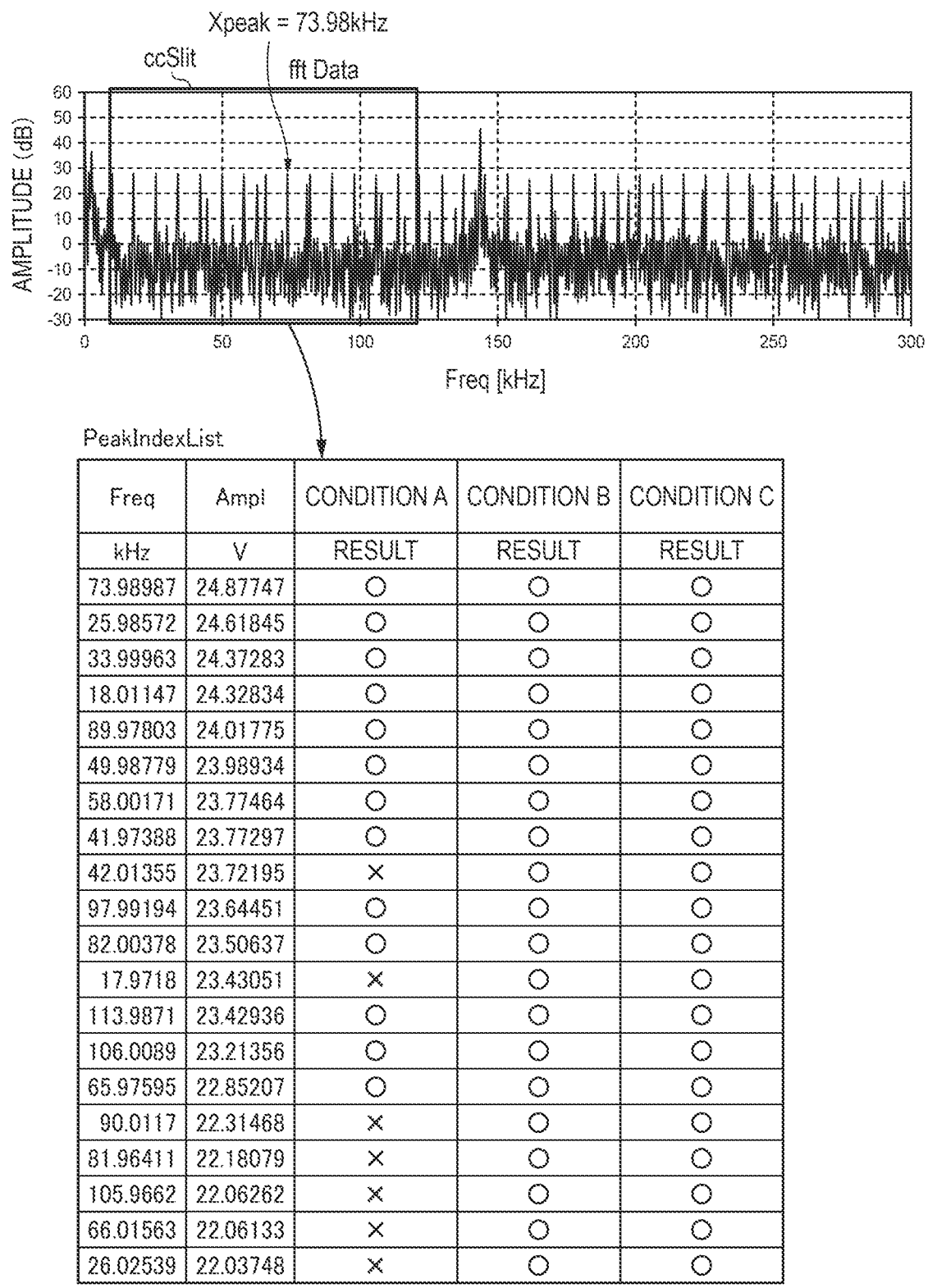
FIG. 14 shows detection of a peak frequency.

Next, the processing of the peak frequency detector 105 will be described in detail. That is, the process of S600 shown in FIG. 4 will be described in detail. FIG. 13 is a flowchart showing an example of the processing of the peak frequency detector 105 according to Embodiment 1; FIG. 14 shows detection of a peak frequency.

As S601, the peak frequency detector 105 extracts frequencies having particularly large amplitude from the segment ccSlit(f) where the correlation function R(m) is calculated. For example, the peak frequency detector 105 extracts a predetermined number of frequencies in descending order of amplitude from the segment ccSlit(f). As shown in FIG. 14, the peak frequency detector 105 includes the extracted frequencies in second peak list information. Hereinafter, the second peak list information may be referred to as peakIndexList.

As S602, the peak frequency detector 105 refers to the broadcast detection information detBcResult, and excludes each frequency that does not satisfy a condition B from the peakIndexList. Each frequency that satisfies the condition B is a frequency that is not included in the frequency range of any broadcast. Specifically, the peak frequency detector 105 leaves each frequency that is not included in the frequency range of any broadcast in the peakIndexList. A column of "condition B" shown in FIG. 14 shows a determination result of whether the condition B is satisfied provided by the peak frequency detector 105 at each frequency. The determination result is indicated by "o" when the condition B is satisfied, and is indicated by "×" when the condition B is not satisfied. In the example shown in FIG. 14, it is determined that all frequencies satisfy the condition B.

As S603, the peak frequency detector 105 excludes each frequency that does not satisfy a condition A from the peakIndexList. Each frequency that satisfies the condition A is a frequency that has higher amplitude than preceding and succeeding frequencies, that is, a frequency having amplitude that is a local maximum value. Specifically, the peak frequency detector 105 leaves, in the peakIndexList, each frequency having a higher amplitude than an amplitude of a frequency lower by the unit frequency unitF than itself and a higher amplitude than an amplitude of the frequency higher by the unit frequency unitF than itself, that is, a frequency having a local maximum amplitude. In a column of "condition A" shown in FIG. 14, a determination result of whether the condition A is satisfied provided by the peak frequency detector 105 at each frequency is shown. The determination result is indicated by "o" when the condition A is satisfied, and is indicated by "×" when the condition A is not satisfied.

As S604, the peak frequency detector 105 extracts each frequency that satisfies a condition C from the frequencies included in the peakIndexList. Each frequency satisfying the condition C is a frequency at which both amplitude of a frequency obtained by adding the noise frequency interval fcyc and amplitude of a frequency obtained by subtracting the noise frequency interval fcyc have local maximum values. Specifically, the peak frequency detector 105 extracts, from the peakIndexList, each frequency at which amplitude of a frequency shifted by the noise frequency interval fcyc also has a local maximum value. In other words, the peak frequency detector 105 selects one frequency to be processed from the peakIndexList, and extracts the selected frequency if the selected frequency has one local maximum value that is periodically generated on a spectrum for each noise frequency interval fcyc. By performing S604, even if a frequency of noise that does not appear at regular frequency intervals is detected by the peak frequency detector 105, the detected frequency can be prevented from being extracted as the extracted noise peak frequency. In a column of "condition C" shown in FIG. 14, a determination result of whether the condition C is satisfied provided by the peak frequency detector 105 at each frequency is shown. The determination result is indicated by "o" when the condition C is satisfied, and is indicated by "×" when the condition C is not satisfied.

As S605, the peak frequency detector 105 sets a frequency that has largest amplitude among the frequencies extracted in S604 as the extracted noise peak frequency Xpeak. For example, in the case of FIG. 14, among the frequencies satisfying all the conditions A, B, and C in the peakIndexList, a frequency having largest amplitude is 73.98987 kHz, and thus the peak frequency detector 105 sets Xpeak=73.98987 kHz.

<Details of Processing of Frequency Shift Amount Determining Unit>

Figure 15:
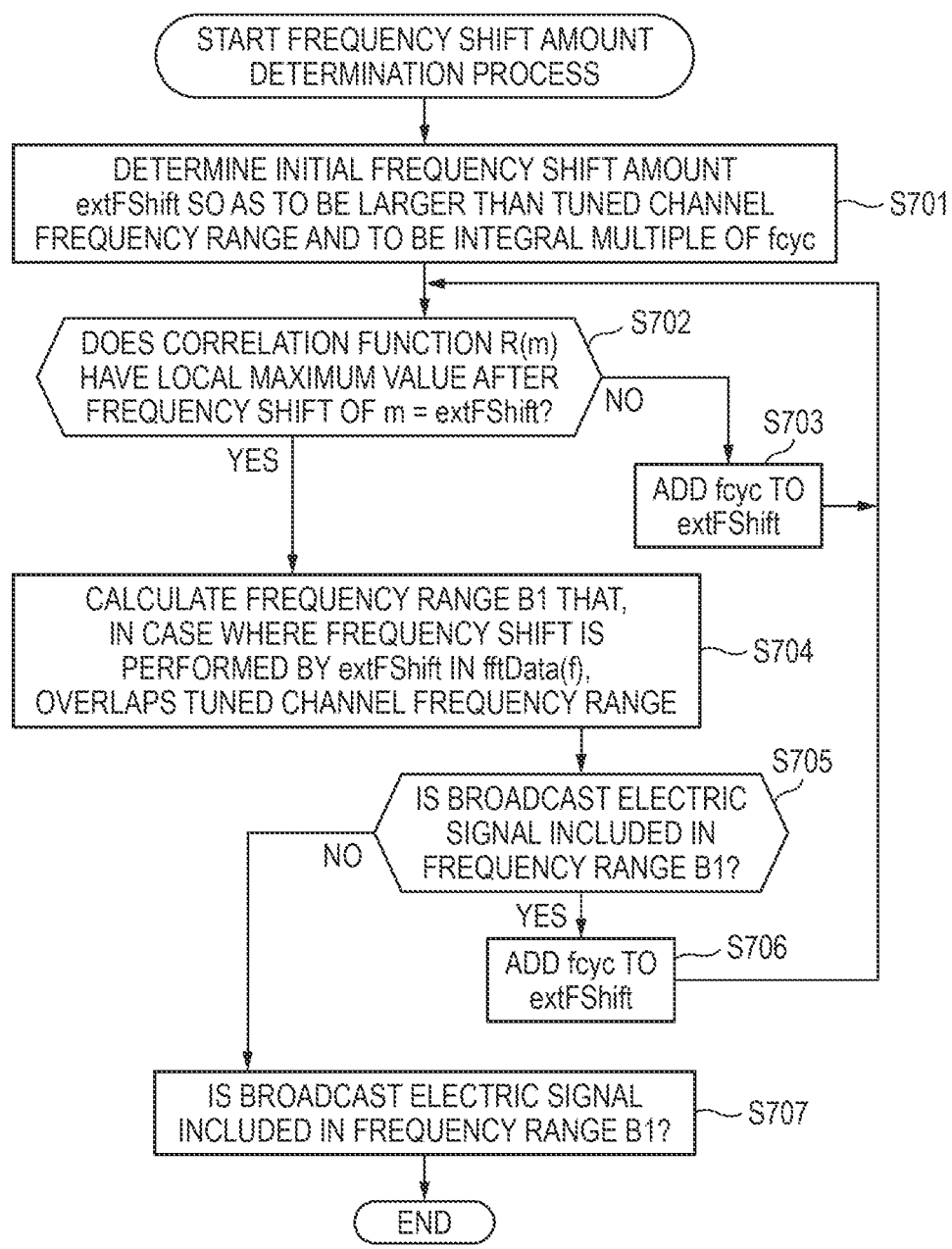
FIG. 15 is a flowchart showing an example of processing of a frequency shift amount determining unit according to Embodiment 1.
Figure 16:
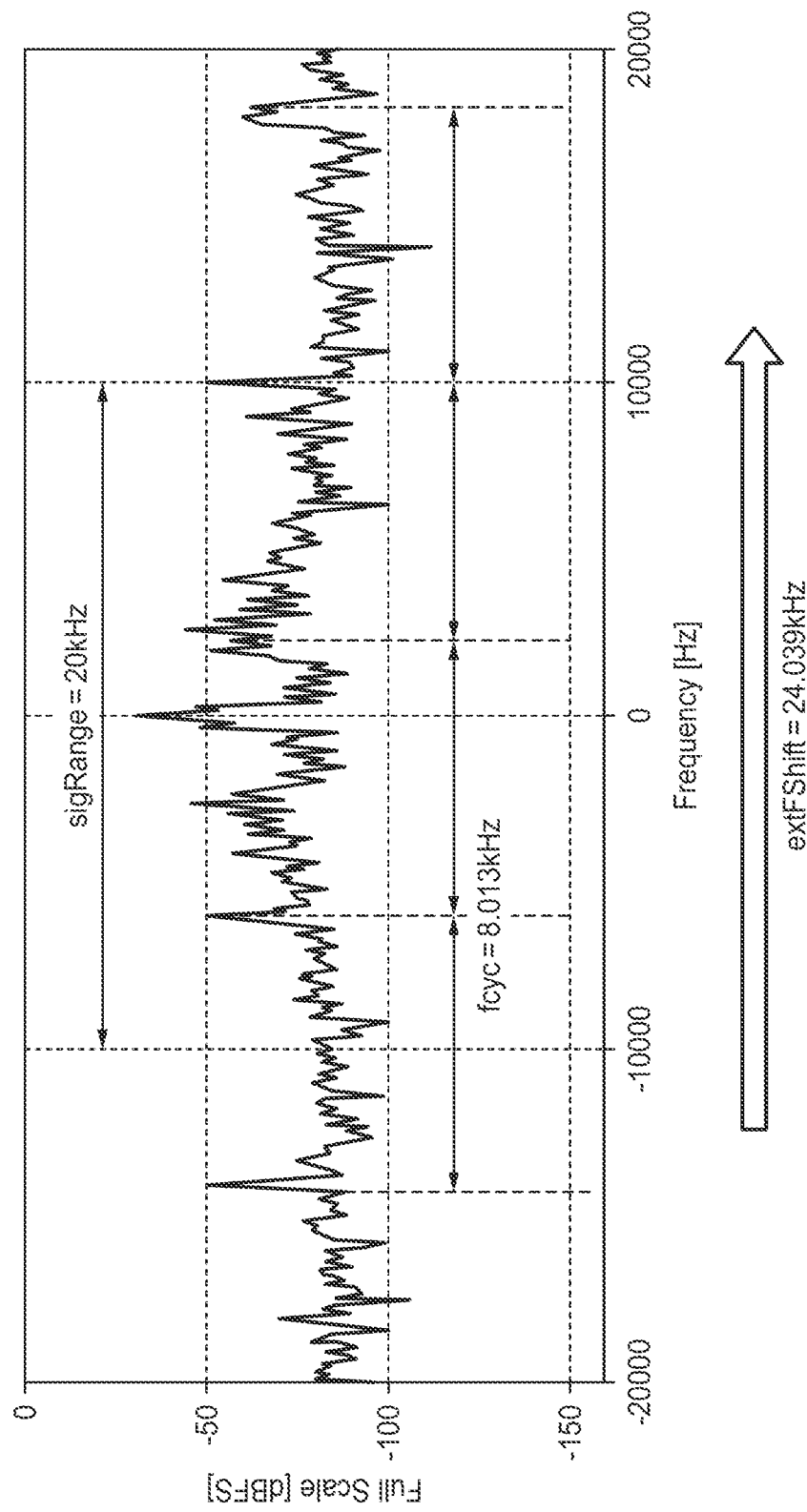
FIG. 16 shows a relationship between a tuned channel frequency range and a noise frequency interval.
Figure 17:
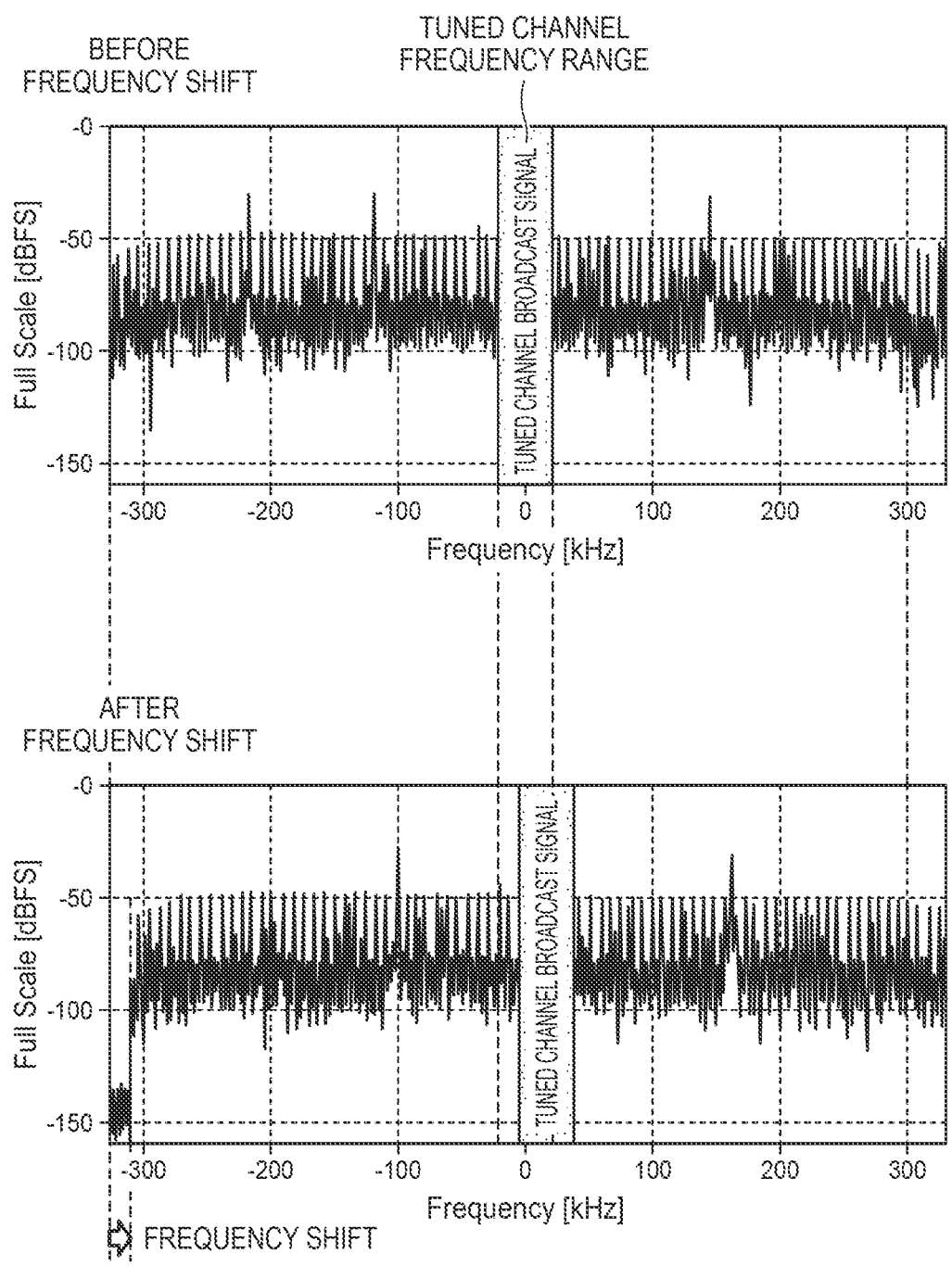
FIG. 17 shows a case where a tuned channel frequency range of the input frequency domain signal overlaps with a tuned channel frequency range of a frequency-shifted frequency domain signal.
Figure 18:
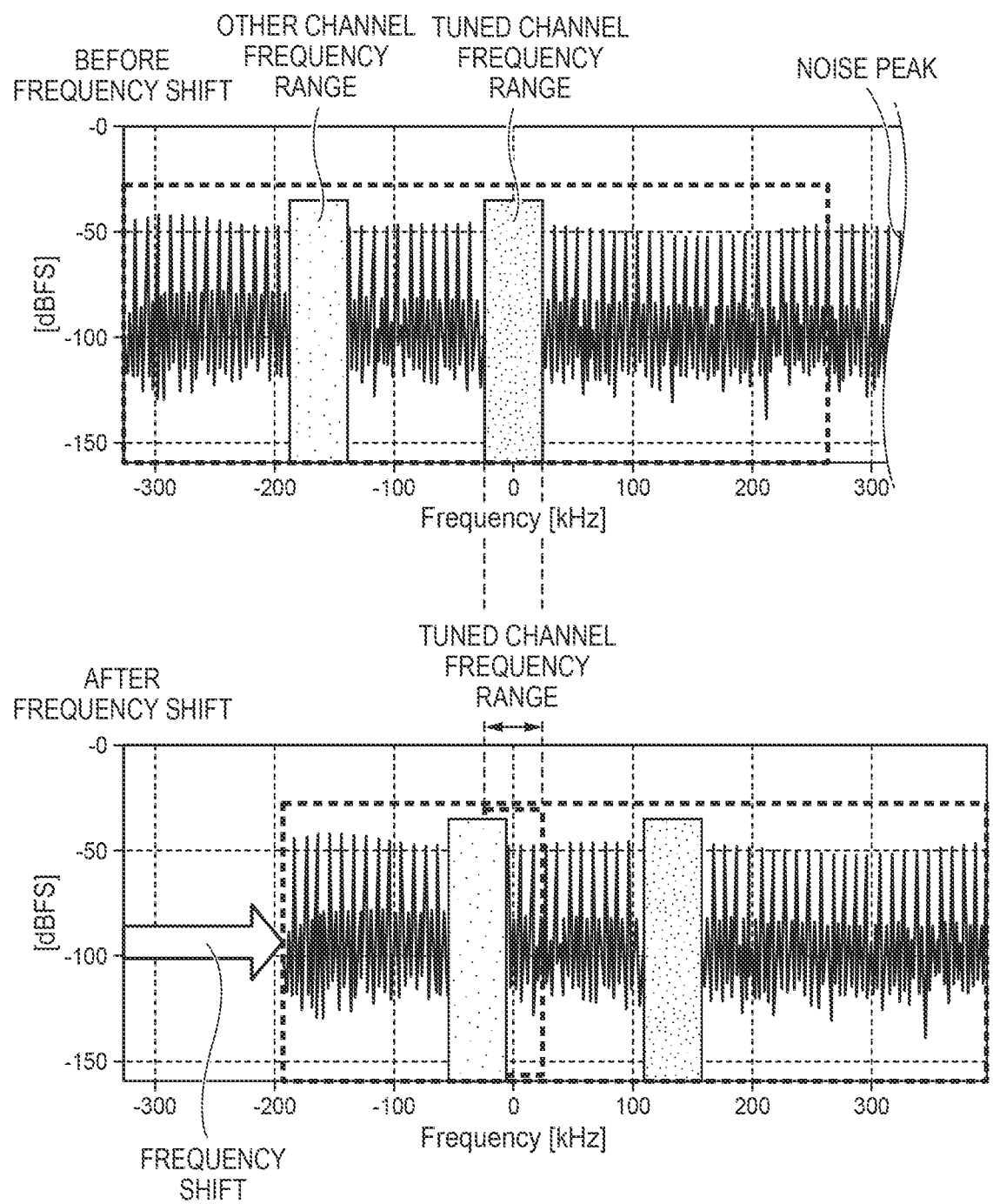
FIG. 18 shows a case where the tuned channel frequency range of the input frequency domain signal overlaps with another channel frequency range of the frequency-shifted frequency domain signal.
Figure 19:
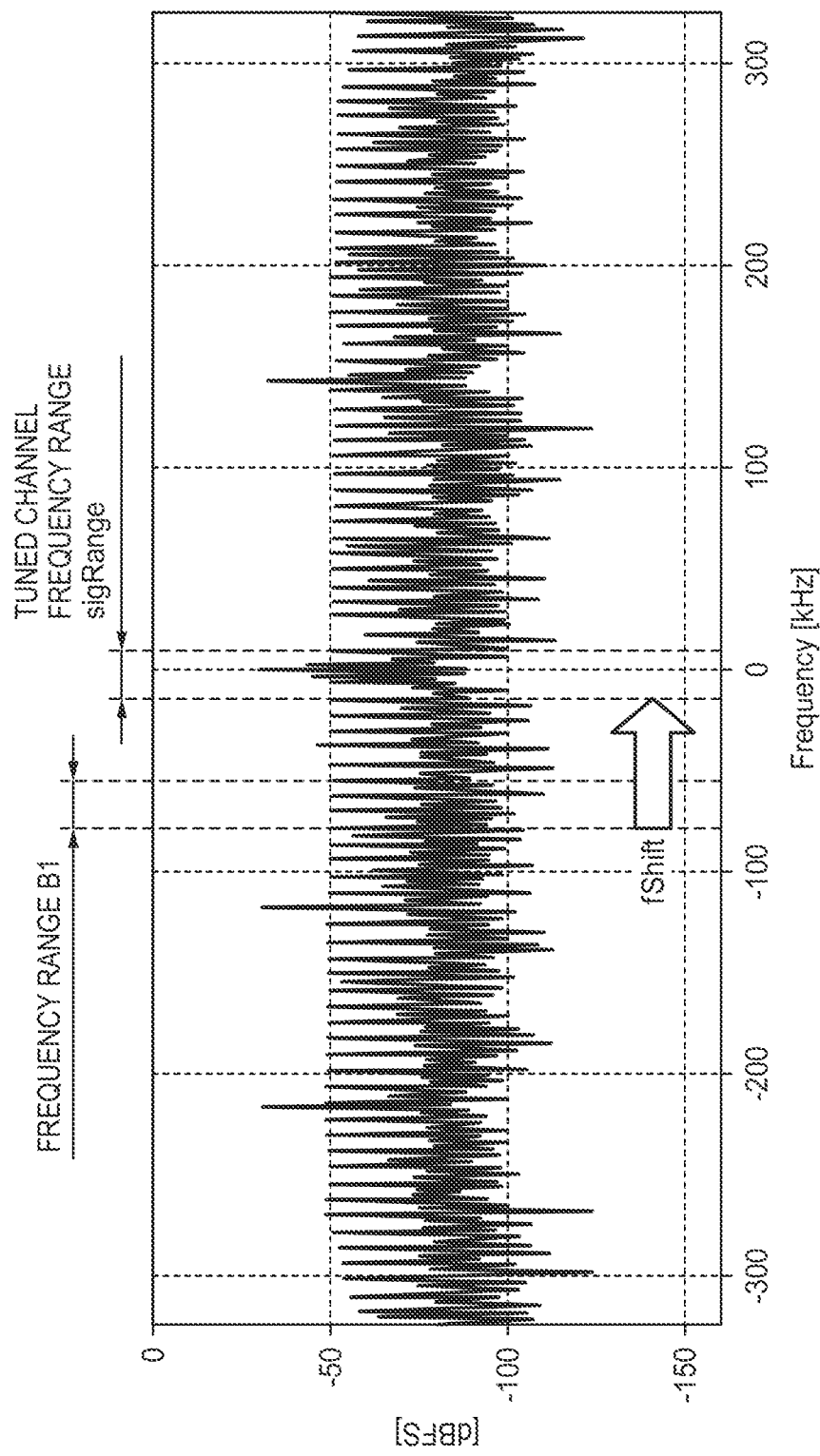
FIG. 19 shows a frequency range B1 that overlaps with the tuned channel frequency range after a frequency shift.

Next, the processing of the frequency shift amount determining unit 106 will be described in detail. That is, the process of S700 shown in FIG. 4 will be described in detail. FIG. 15 is a flowchart showing an example of the processing of the frequency shift amount determining unit 106 according to Embodiment 1. FIG. 16 shows a relationship between the tuned channel frequency range and the noise frequency interval. FIG. 17 shows a case where the tuned channel frequency range of the input frequency domain signal overlaps with the tuned channel frequency range of the frequency-shifted frequency domain signal. FIG. 18 shows a case where the tuned channel frequency range of the input frequency domain signal overlaps with the other channel frequency range of the frequency-shifted frequency domain signal. FIG. 19 shows a frequency range that overlaps with the tuned channel frequency range after a frequency shift.

As S701, as shown in FIG. 16, the frequency shift amount determining unit 106 determines an initial frequency shift amount in such a manner that the initial frequency shift amount is larger than the tuned channel frequency range and is an integral multiple of the noise frequency interval fcyc. Hereinafter, the tuned channel frequency range may be expressed as sigRange, and the initial frequency shift amount may be expressed as extFShift. For example, the frequency shift amount determining unit 106 calculates the extFShift by the following Formula 5.

$$\text{extFShift}=(\text{floor}(\text{sigRange}/\text{fcyc})+1)\times \text{fcyc} \quad \text{(Formula 5)}$$

Here, floor(x) is a function that returns a value obtained by truncating a decimal part of x.

A reason why the initial frequency shift amount extFShift is determined to be larger than the tuned channel frequency range sigRange and to be an integral multiple of the noise frequency interval fcyc in S701 is as follows. That is, as shown in FIG. 17, when the frequency shift amount is narrower than the tuned channel frequency range, the tuned channel frequency range of the output signal of the second converter 111 overlaps the tuned channel frequency range of the output signal of the delay device 112 when the noise canceller 113 performs the signal synthesis by which the output signal of the second converter 111 is subtracted from the output signal of the delay device 112. It should be noted that the output signal of the second converter 111 corresponds to a signal obtained by converting the postFftDataShift(f) into a time domain signal. The tuned channel frequency range of the output signal of the delay device 112 corresponds to the tuned channel frequency range of the fftData(f). The tuned channel frequency range of the output signal of the second converter 111 corresponds to the tuned channel frequency range of the postFftDataShift(f). As a result, tuned channel broadcast signals interfere with each other, and thus new noise is included in a radio sound. The new noise is noise generated by interference of broadcast electromagnetic waves, and is noise different from the noise having peaks of amplitude at regular frequency intervals in the frequency domain, which is a target of the signal processing device of the present disclosure.

Therefore, in a case where the tuned channel frequency range sigRange=20 kHz and the noise frequency interval fcyc=8.013 kHz as shown in FIG. 16, for example, the frequency shift amount determining unit 106 may calculate the initial frequency shift amount extFShift as floor ((20/8.013)+1)×8.013=3×8.013=24.039 kHz by Formula 5.

As S702, the frequency shift amount determining unit 106 determines whether the correlation function R(m) has a local maximum value after a frequency shift of m=extFShift. It should be noted that m is the frequency shift amount of the window ccData(f) in the calculation of the correlation function R(m), and hereinafter, the frequency shift amount may also be referred to as a frequency.

That is, when a lowest frequency among peaks of the correlation function R(m) is m0 [kHz], it is determined whether the correlation function R(m) satisfies a condition of a peak even at a frequency of m0+extFShift [kHz]. Here, each peak of the correlation function R(m) may satisfy the same detection condition as the RpeakList. As described above, the detection condition of the RpeakList includes two conditions, one is that the correlation function R(m) has a local maximum value and the other is that the correlation function R(m) is equal to or higher than the predetermined threshold value. When a frequency range of the ccData(f) is set in such a manner that m0=0 [kHz], it may be determined whether the correlation function R(m) satisfies the condition of the peak at a frequency of m=extFShift [kHz]. The peak may also satisfy the same detection condition as the RpeakList. When the frequency range of the ccData(f) is selected in such a manner that the lower limit frequency of the ccData(f) and a lower limit frequency of the ccSlit(f) are the same frequency, the correlation function R(m) has a peak at m=0 [kHz]. In this case, since the frequency m0 that has the lowest frequency peak is 0 [kHz], it may be determined whether the correlation function R(m) satisfies the condition of the peak at the frequency of m=extFShift [kHz]. It should be noted that the peak may also satisfy the same detection condition as the RpeakList. FIG. 12 shows an example of a waveform of the correlation function R(m) in such a case.

When it is determined that the correlation function R(m) does not have the local maximum value after the frequency shift of m=extFShift (S702: NO), as S703, the frequency shift amount determining unit 106 adds the noise frequency interval fcyc to the extFShift, and returns to the process of S702.

When the frequency shift amount determining unit 106 determines that the correlation function R(m) has a local maximum value after the frequency shift of m=extF Shift (S702: YES), the process proceeds to S704. When the extFShift is an integral multiple of the fcyc, the determination in S702 is YES in principle, and thus the frequency shift amount determining unit 106 may not perform the processes of S702 and S703. However, it is not self-evident whether the correlation function R(m) has a local maximum value that is equal to or higher than the predetermined threshold value (for example, 0.5) at all frequencies that are integral multiples of the noise frequency interval fcyc. When the value of the correlation function R(m) is low at the selected frequency of the extFShift, an expected noise cancellation effect may not be obtained. Therefore, in order to improve reliability of the selected frequency of the extFShift, it is desirable to perform the processes of S702 and S703.

As S704, the frequency shift amount determining unit 106 calculates a frequency range B1 that overlaps the tuned channel frequency range when the frequency shift is performed by the extFShift in the fftData(f). For example, when the tuned channel frequency range is (−sigRange/2 to +sigRange/2), the frequency shift amount determining unit 106 calculates ((−extFShift−sigRange/2) to (−extFShift+sigRange/2)) as the frequency range B1.

As S705, the frequency shift amount determining unit 106 refers to the broadcast detection information detBcResult and determines whether the broadcast electric signal is included in the frequency range B1.

When it is determined that the broadcast electric signal is included in the frequency range B1 (S705: YES), as S706, the frequency shift amount determining unit 106 adds the fcyc to the extFShift, and returns to the process of S702. A reason why S706 is performed when S705 is YES is as follows. That is, as shown in FIG. 18, if the frequency is directly shifted by the extFShift, the other channel broadcast signal included in the frequency range B1 interferes with the tuned channel broadcast signal in the tuned channel frequency range.

When the frequency shift amount determining unit 106 determines that the broadcast electric signal is not included in the frequency range B1 (S705: NO), the process proceeds to S707.

As S707, the frequency shift amount determining unit 106 determines the current extFShift as the frequency shift amount fShift. As a result, as shown in FIG. 19, the frequency shift amount determining unit 106 can determine the frequency shift amount fShift in such a manner that the frequency range B1 that includes neither the tuned channel broadcast signal nor the other channel broadcast signal overlaps the tuned channel frequency range.

<Details of Processing of Amplitude Correction Factor Determining Unit>

Figure 20:
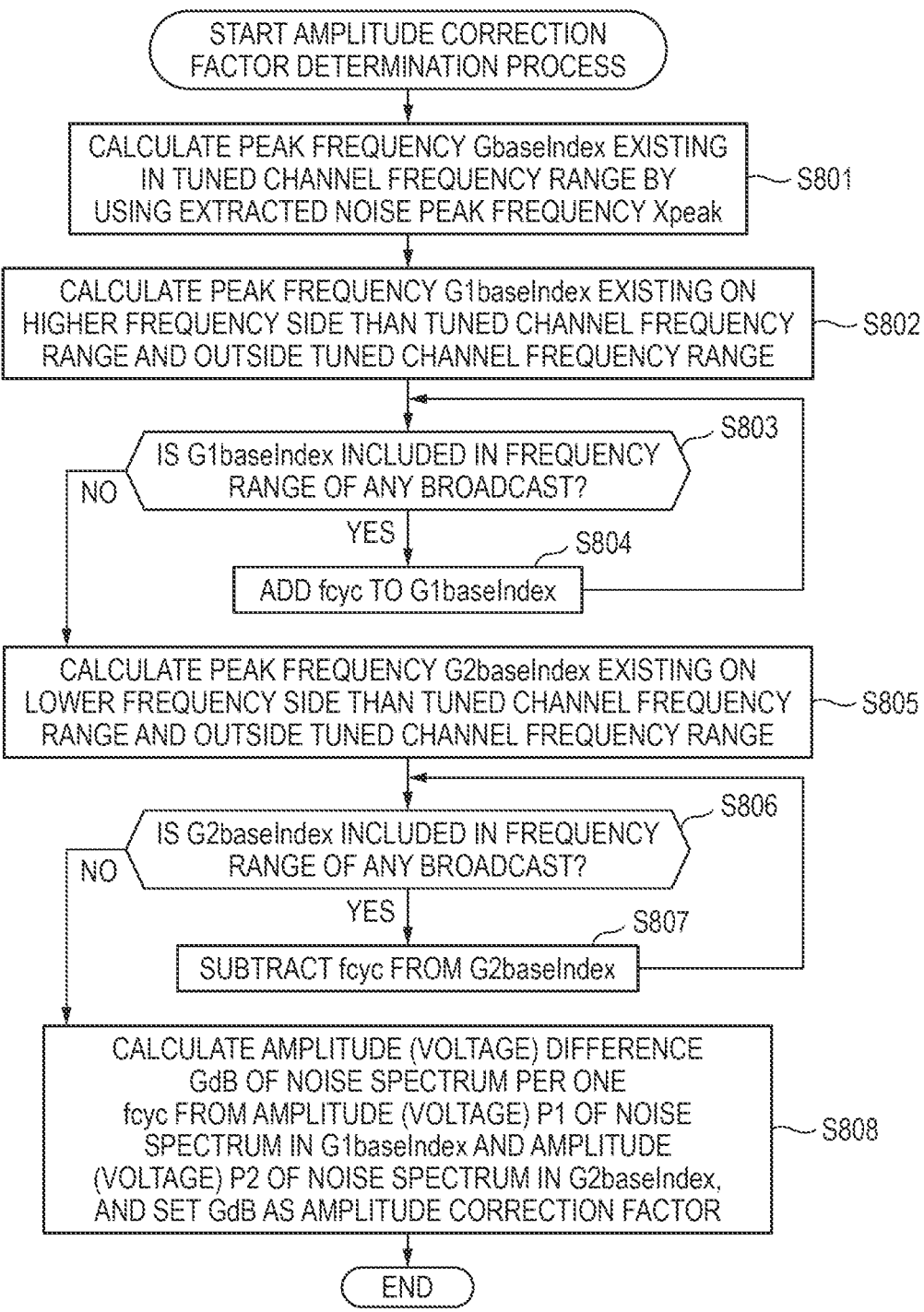
FIG. 20 is a flowchart showing an example of processing of an amplitude correction factor determining unit according to Embodiment 1.
Figure 21:
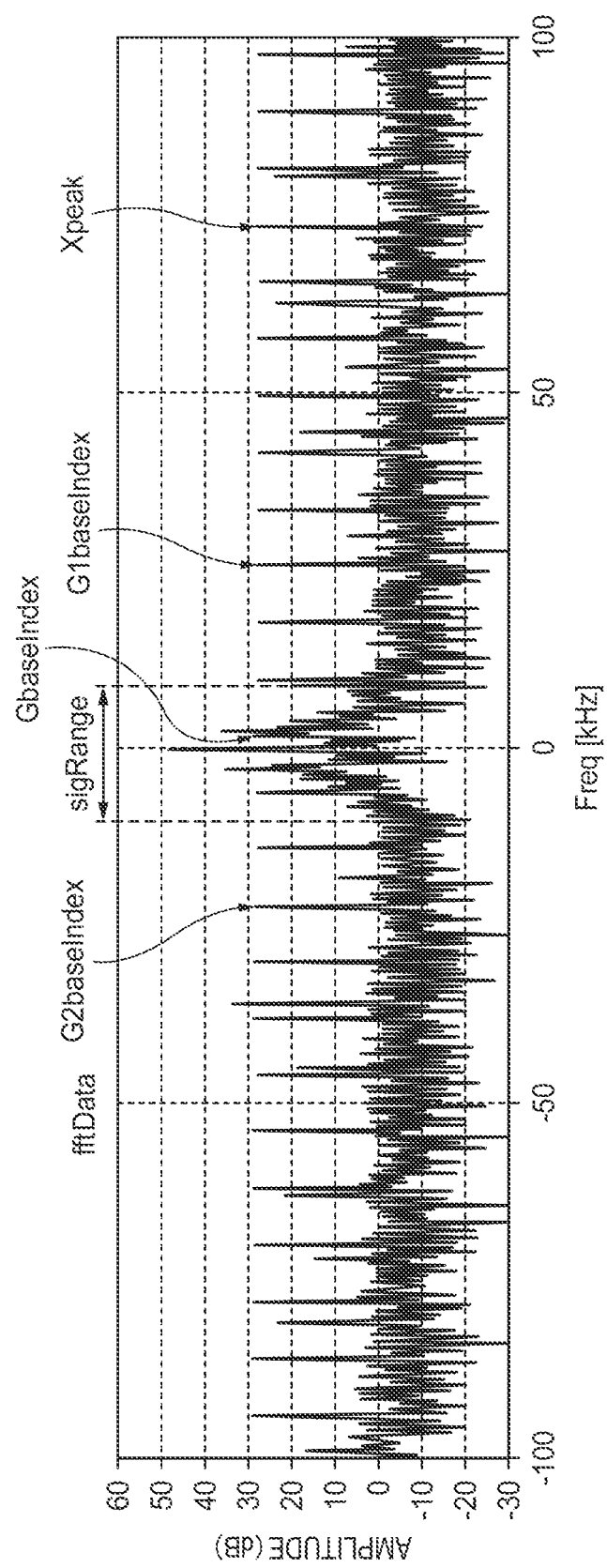
FIG. 21 shows a method of calculating a peak frequency used for calculating an amplitude correction factor.
Figure 22:
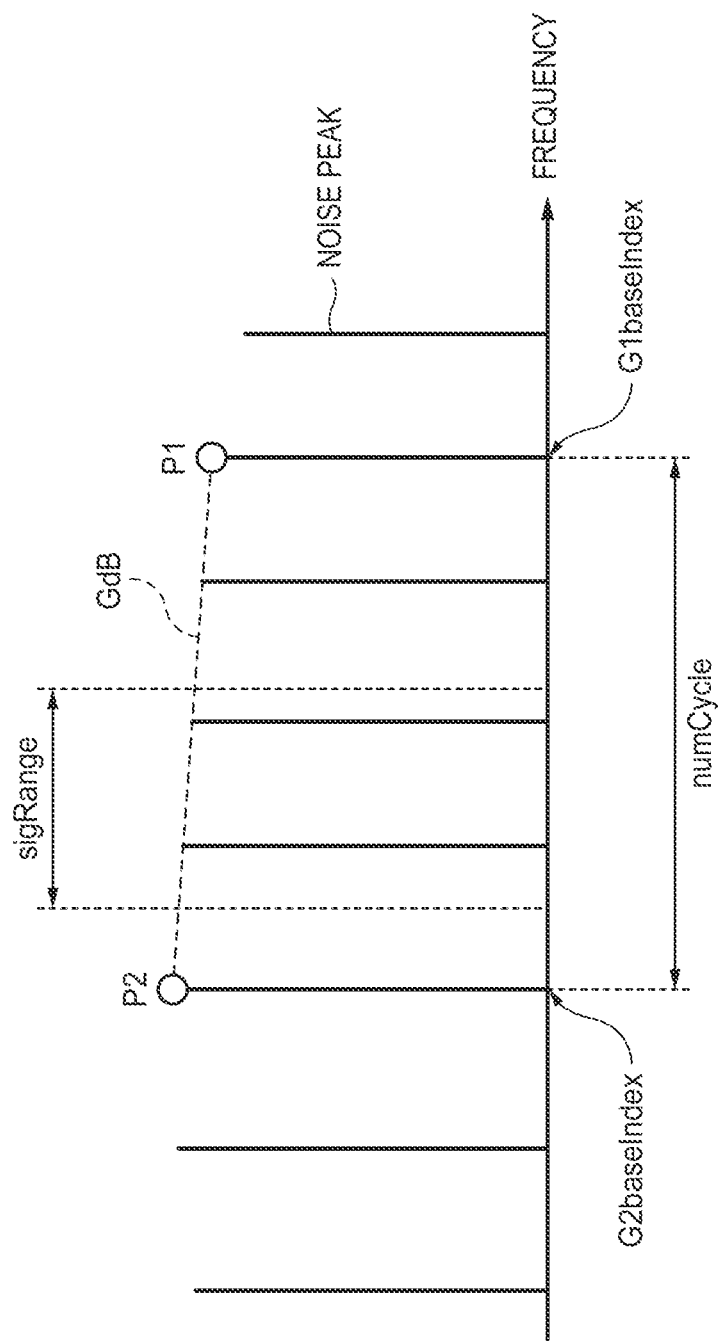
FIG. 22 shows a method of calculating the amplitude correction factor.

Next, the processing of the amplitude correction factor determining unit 107 will be described in detail. That is, the process of S800 shown in FIG. 4 will be described in detail. FIG. 20 is a flowchart showing an example of the processing of the amplitude correction factor determining unit 107 according to Embodiment 1. FIG. 21 shows a method of calculating a peak frequency used for calculating an amplitude correction factor. FIG. 22 shows a method of calculating the amplitude correction factor.

There are cases where a noise peak frequency of the frequency-shifted frequency domain signal fftDataShift(f) coincides with that of the input frequency domain signal fftData(f) before the frequency shift, while at least one of amplitude and phase thereof does not coincide with that of the input frequency domain signal fftData(f) before the frequency shift. Therefore, when the noise canceller 113 performs the signal synthesis by which the output signal of the second converter 111 is subtracted from the output signal of the delay device 112, even if the signal synthesis is performed by directly inputting the fftDataShift(f) to the second converter 111 and subtracting the output signal output from the second converter 111, a sufficient noise cancellation effect may not be obtained. Therefore, the amplitude and the phase of the frequency-shifted frequency domain signal fftDataShift(f) are preferably corrected so as to coincide with the amplitude and the phase of the input frequency domain signal fftData(f) before the frequency shift. Through verification, the inventors have found that amplitude and phase of a noise spectrum have a proportional relationship with a frequency. Therefore, in the present embodiment, an amplitude difference between the two noise peaks per one noise frequency interval fcyc is calculated as an amplitude correction factor, a phase difference between the two noise peaks per one noise frequency interval fcyc is calculated as a phase correction factor, and the amplitude and the phase of the fftDataShift(f) are corrected by utilizing the proportional relationship of the amplitude and the phase.

As S801, the amplitude correction factor determining unit 107 calculates a peak frequency existing in the tuned channel frequency range by using the extracted noise peak frequency Xpeak as shown in FIG. 21. Hereinafter, the peak frequency existing in the tuned channel frequency range may be expressed as GbaseIndex. For example, the amplitude correction factor determining unit 107 calculates the GbaseIndex by the following Formula 6.

$$\text{GbaseIndex} = \text{Xpeak} - \text{floor}(\text{Xpeak}/\text{fcyc}) \times \text{fcyc} \quad \text{(Formula 6)}$$

As S802, as shown in FIG. 21, the amplitude correction factor determining unit 107 calculates a peak frequency that exists on a higher frequency side than the tuned channel frequency range outside the tuned channel frequency range. Hereinafter, the peak frequency that exists on the higher frequency side than the tuned channel frequency range outside the tuned channel frequency range may be expressed as G1baseIndex.

As S803, the amplitude correction factor determining unit 107 refers to the broadcast detection information detBcResult and determines whether the G1baseIndex is included in the frequency range of any broadcast.

When it is determined that the G1baseIndex is included in the frequency range of any broadcast (S803: YES), as S804, the amplitude correction factor determining unit 107 adds the fcyc to the G1baseIndex, and returns to the process of S803.

When it is determined that the G1baseIndex is not included in the frequency range of any broadcast (S803: NO), the amplitude correction factor determining unit 107 proceeds to the process of S805.

As S805, as shown in FIG. 21, the amplitude correction factor determining unit 107 calculates a peak frequency that exists on a lower frequency side than the tuned channel frequency range outside the tuned channel frequency range. Hereinafter, the peak frequency that exists on the lower frequency side than the tuned channel frequency range outside the tuned channel frequency range may be expressed as G2baseIndex.

As S806, the amplitude correction factor determining unit 107 refers to the broadcast detection information detBcResult and determines whether the G2baseIndex is included in the frequency range of any broadcast.

When it is determined that the G2baseIndex is included in the frequency range of any broadcast (S806: YES), as S807, the amplitude correction factor determining unit 107 subtracts the fcyc from the G2baseIndex, and returns to the process of S805.

When it is determined that the G2baseIndex is a not included in the frequency range of any broadcast (S806: NO), the amplitude correction factor determining unit 107 proceeds to the process of S808.

As S808, as shown in FIG. 22, the amplitude correction factor determining unit 107 calculates an amplitude (voltage) difference GdB between the two noise peaks per one noise frequency interval fcyc from amplitude (voltage) P1 (dB unit system) of the noise peak in the G1baseIndex and amplitude (voltage) P2 (dB unit system) of the noise peak in the G2baseIndex, and sets the GdB as the amplitude correction factor. Here, the amplitude P1 may be 20×log 10 (noise peak amplitude V1 (unit: volt)), and the amplitude P2 may be 20×log 10 (noise peak amplitude V2 (unit: volt)). For example, the amplitude correction factor determining unit 107 calculates the amplitude correction factor GdB by the following Formula 7.

$$GdB = (P1-P2)/((G1\text{baseIndex} - G2\text{baseIndex})/\text{fcyc}) \quad \text{(Formula 7)}$$

Through the above processing, the amplitude correction factor determining unit 107 can calculate the amplitude correction factor GdB.

<Details of Processing of Phase Correction Factor Determining Unit>

Figure 23:
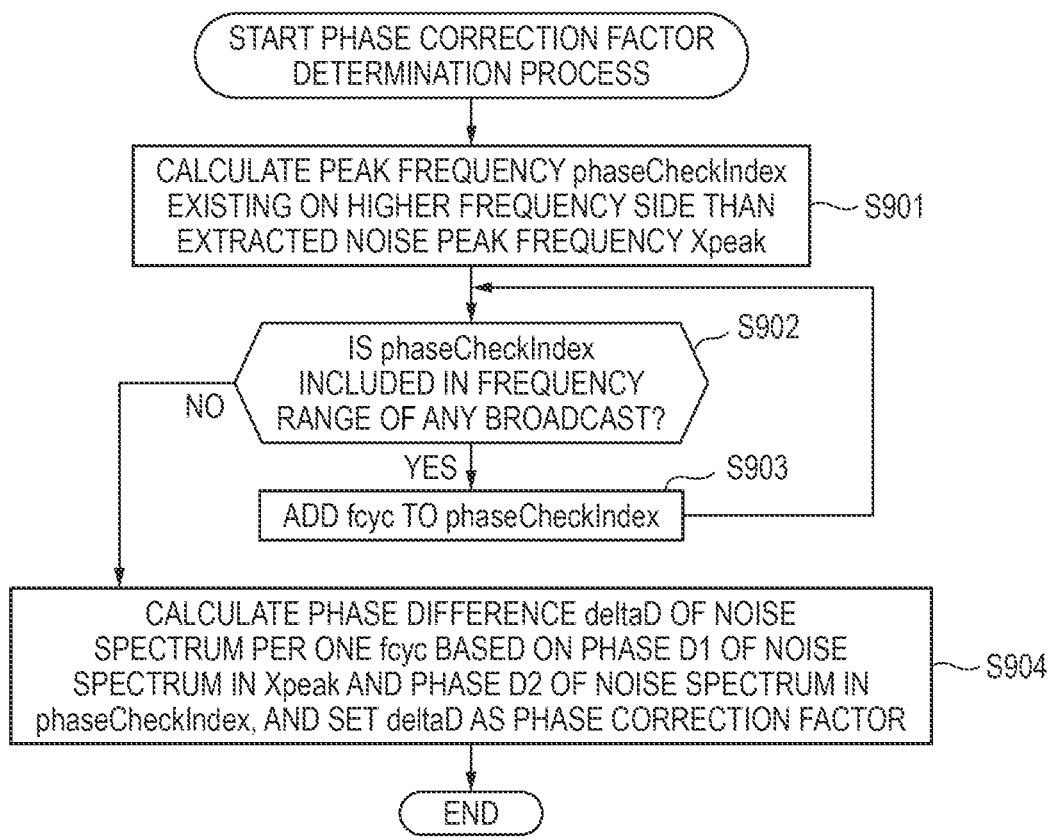
FIG. 23 is a flowchart showing an example of processing of a phase correction factor determining unit according to Embodiment 1.
Figure 24:
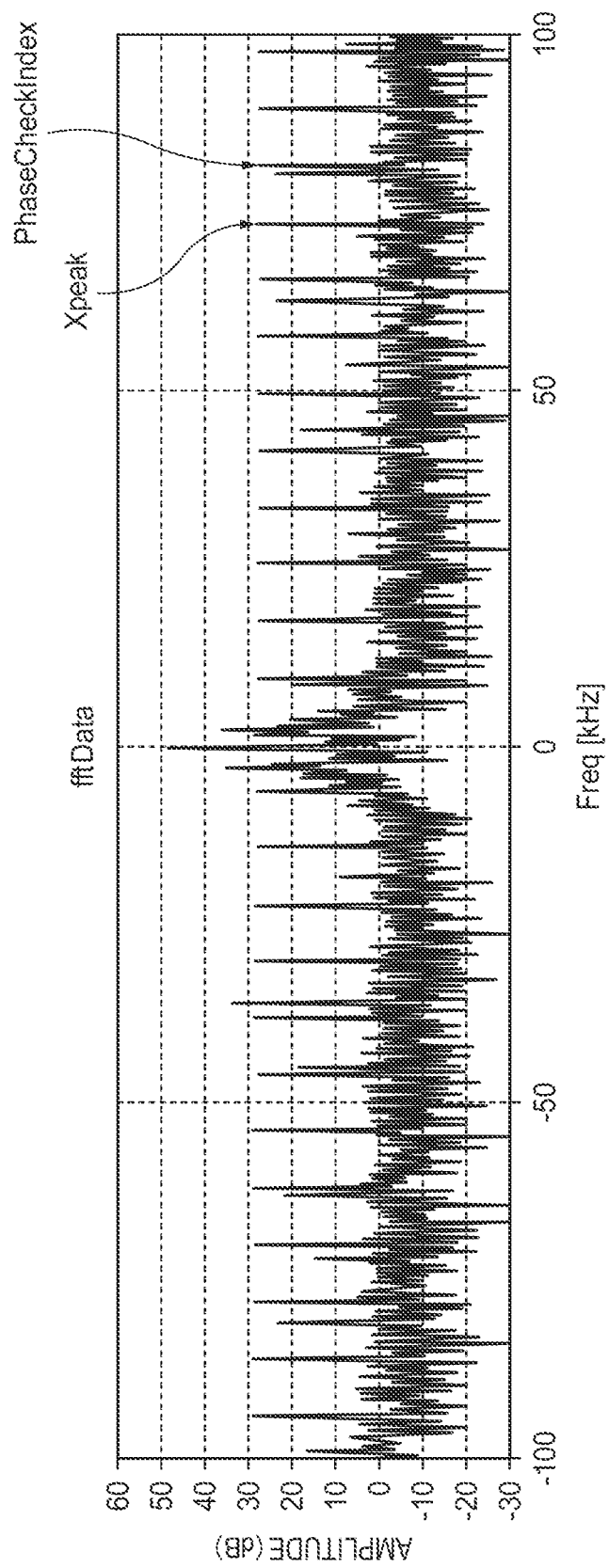
FIG. 24 shows a method of calculating a peak frequency used for calculating a phase correction factor.

Next, the processing of the phase correction factor determining unit 108 will be described in detail. That is, the process of S900 shown in FIG. 4 will be described in detail. FIG. 23 is a flowchart showing an example of the processing of the phase correction factor determining unit 108 according to Embodiment 1. FIG. 24 shows a method of calculating a peak frequency used for calculating a phase correction factor.

As S901, for example, as shown in FIG. 24, the phase correction factor determining unit 108 calculates a peak frequency present on a higher frequency side than the extracted noise peak frequency Xpeak by the following Formula 8. Hereinafter, the peak frequency existing on the higher frequency side than the extracted noise peak frequency Xpeak may be expressed as phaseCheckIndex.

$$\text{phaseCheckIndex} = \text{Xpeak} + \text{fcyc} \quad \text{(Formula 8)}$$

As S902, the phase correction factor determining unit 108 refers to the broadcast detection information detBcResult and determines whether the phaseCheckIndex is included in the frequency range of any broadcast.

When it is determined that the phaseCheckIndex is included in the frequency range of any broadcast (S902: YES), as S903, the phase correction factor determining unit 108 adds the fcyc to the phaseCheckIndex, and returns to the process of S902.

When it is determined that the phaseCheckIndex is not included in the frequency range of any broadcast (S902: NO), the phase correction factor determining unit 108 proceeds to the process of S904.

As S904, the phase correction factor determining unit 108 calculates a phase difference deltaD between the two noise peaks per one noise frequency interval fcyc based on a phase D1 of a noise peak in the Xpeak and a phase D2 of a noise peak in the phaseCheckIndex, and sets the deltaD as the phase correction factor. For example, the phase correction factor determining unit 108 calculates the phase correction factor deltaD by the following Formula 9.

$$\text{deltaD} = (D1-D2)/((\text{Xpeak} - \text{phaseCheckIndex})/\text{fcyc}) \quad \text{(Formula 9)}$$

Through the above processing, the phase correction factor determining unit 108 can calculate the phase correction factor deltaD.

<Details of Processing of Frequency Shifter>

Figure 25:
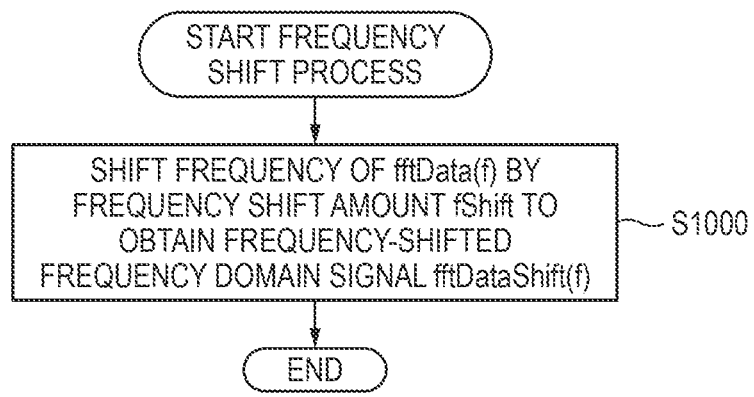
FIG. 25 is a flowchart showing an example of processing of a frequency shifter according to Embodiment 1.
Figure 26:
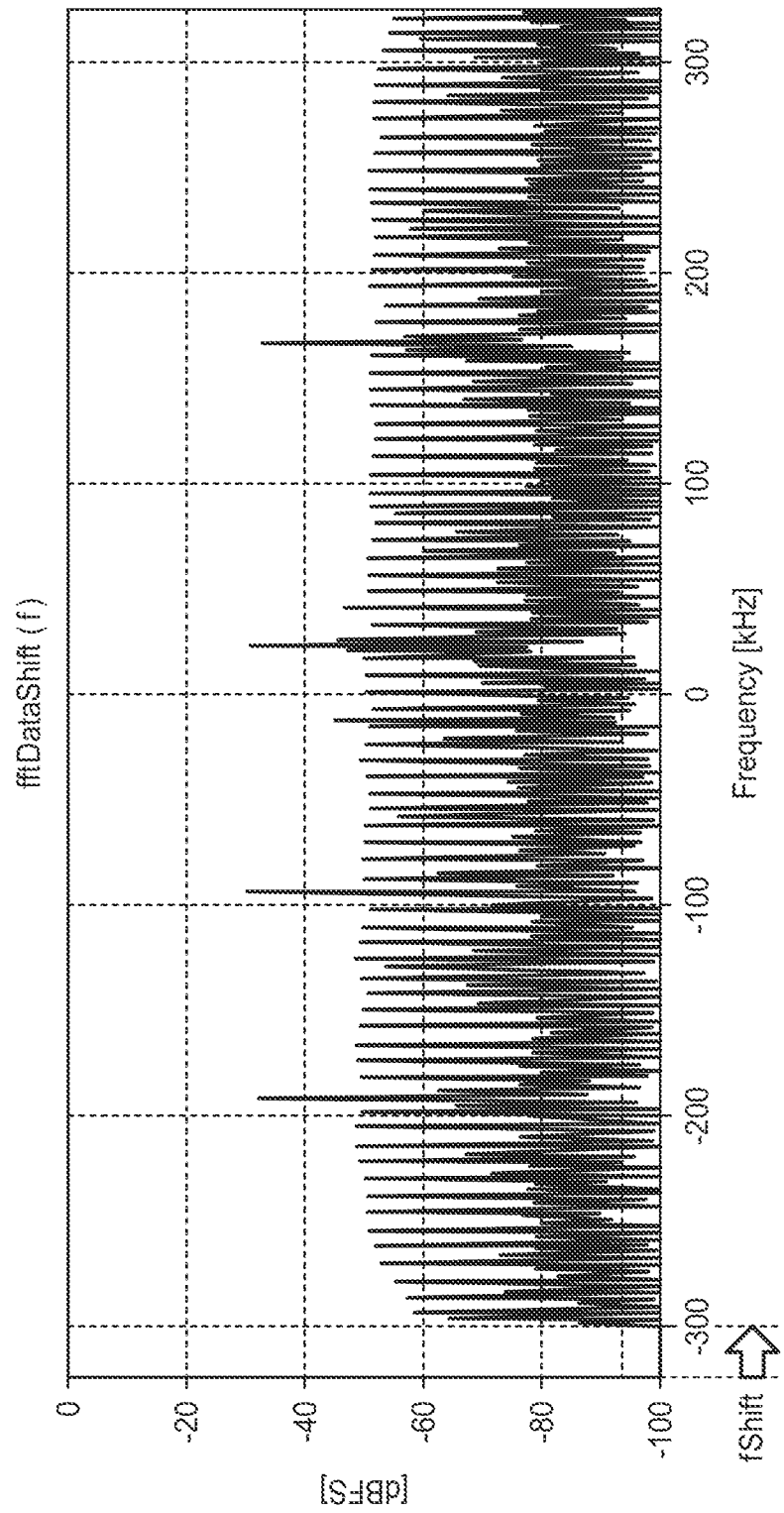
FIG. 26 shows an example of the frequency-shifted frequency domain signal.

Next, the processing of the frequency shifter 109 will be described in detail. That is, the process of S1000 shown in FIG. 4 will be described in detail. FIG. 25 is a flowchart showing an example of the processing of the frequency shifter 109 according to Embodiment 1. FIG. 26 shows an example of the frequency-shifted frequency domain signal.

As S1000, as shown in FIG. 26, the frequency shifter 109 shifts the frequency of the fftData(f) by the frequency shift amount fShift to obtain the frequency-shifted frequency domain signal fftDataShift(f). The frequency shifter 109 may set voltage amplitude at the frequency freed by the frequency shift to 0 in the fftDataShift(f). For example, the frequency shifter 109 obtains the fftDataShift(f) by the following Formula 10.

$$\text{fftShift}=0, \text{ in the case of } (-\text{BWtotal}/2 \text{ to } -\text{BWtotal}/2+\text{fShift})\text{fftDataShift}=\text{fftData}(f+\text{fShift}), \text{ in the case of } (-\text{BWtotal}/2+\text{fShift to BWtotal}/2) \quad \text{(Formula 10)}$$

It should be noted that the voltage amplitude at the frequency freed by the frequency shift may be set to a minute random value instead of 0. Specifically, for example, in the case of FIG. 26, random voltage amplitude in a range of −100 dBFS±10 dB may be used. The phase may also be random. As a result, it is possible to reduce signal distortion that may occur due to waveform discontinuity between a frequency range (−BWtotal/2 to −BWtotal/2+fShift) that is freed by the frequency shift, and a frequency range (−BWtotal/2+fShift to BWtotal/2) that is on a higher frequency side and has finite voltage amplitude from the beginning.

<Details of Processing of Corrector>

Figure 27:
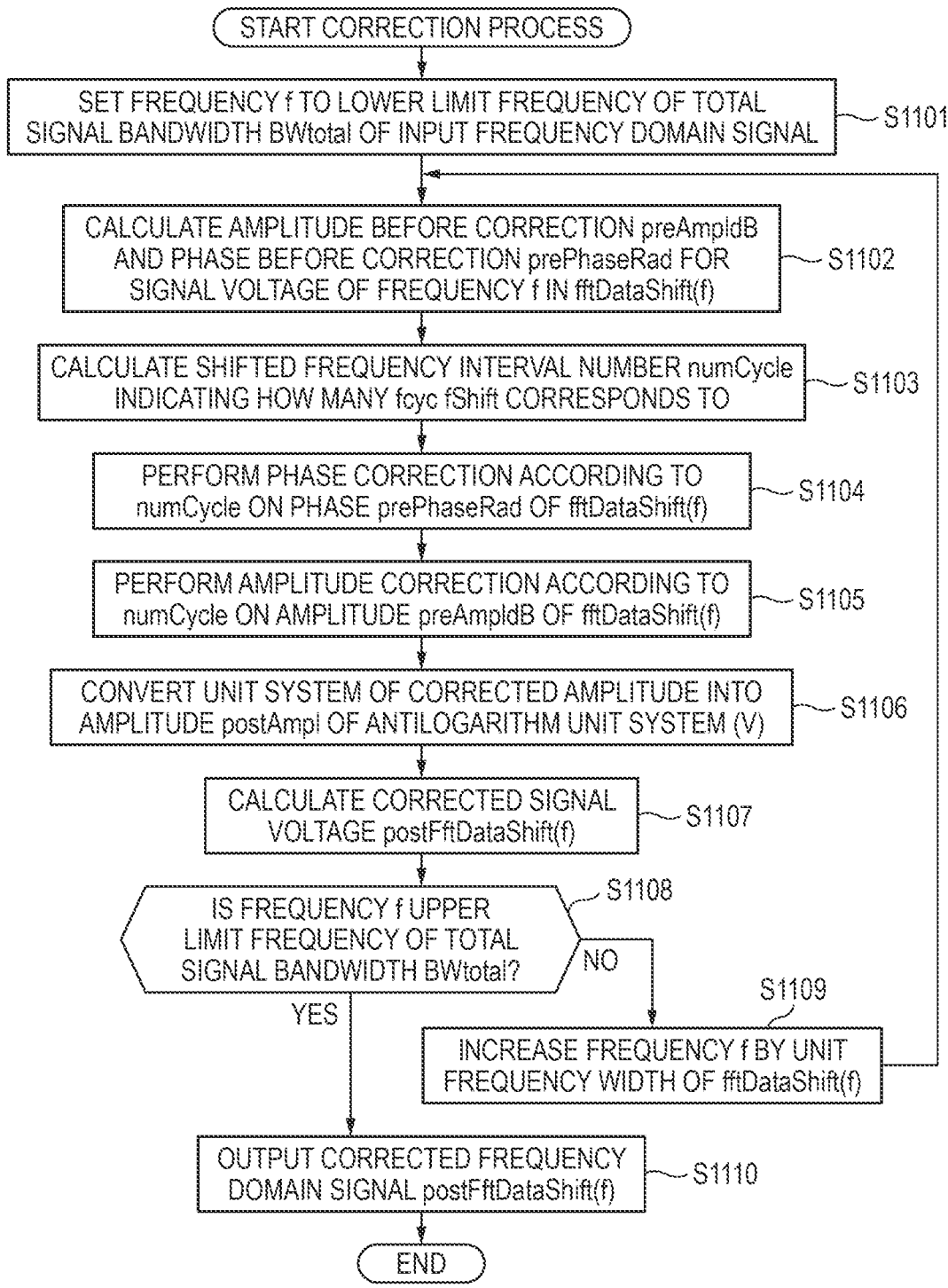
FIG. 27 is a flowchart showing an example of processing of a corrector according to Embodiment 1.

Next, the processing of the corrector 110 will be described in detail. That is, the process of S1100 shown in FIG. 4 will be described in detail. FIG. 27 is a flowchart showing an example of the processing of the corrector 110 according to Embodiment 1. FIG. 28 shows amplitude correction and phase correction according to Embodiment 1.

As S1101, the corrector 110 sets a frequency f to a lower limit frequency of the total signal bandwidth BWtotal of the input frequency domain signal.

As S1102, the corrector 110 calculates amplitude and phase before correction for a signal voltage (complex number) of the frequency f in the frequency-shifted frequency domain signal fftDataShift(f), for example, by the following Formula 11. Hereinafter, dB unit system amplitude (unit: dBV) before correction may be expressed as preAmpldB, antilogarithm unit system amplitude (unit: V) may be expressed as preAmpl, and a phase before correction may be expressed as prePhaseRad (unit: radian). It should be noted that the fftDataShift(f) is a complex number function that has a voltage dimension like the fftData(f) and is represented by a unit system of V (volt).

$$\text{Amplitude:preAmpldB} = 20 \times \log(\text{preAmpl}) = 20 \times \log(\text{abs}(\text{fftDataShift}(f)))$$

$$\text{Phase:prePhaseRad} = \arctan(\text{imaginary}(\text{fftDataShift}(f))/\text{real}(\text{fftDataShift}(f))) \quad \text{(Formula 11)}$$

Here, abs(x) is a function that returns an absolute value of a complex number x. imaginary(x) is a function that returns a value b of an imaginary part of the complex number x=a+jb. real(x) is a function that returns a value a of a real part of the complex number x=a+jb.

As S1103, the corrector 110 calculates a shifted frequency interval number indicating how many noise frequency intervals fcyc the frequency shift amount fShift corresponds to, for example, by the following Formula 12. Hereinafter, the shifted frequency interval number may be expressed as numCycle.

$$\text{numCycle} = \text{round}(\text{fShift/fcyc}) \quad \text{(Formula 12)}$$

Here, round(x) is a function that returns a value obtained by rounding off x.

As S1104, the corrector 110 performs phase correction according to the shifted frequency interval number numCycle on the phase prePhaseRad of the frequency-shifted frequency domain signal fftDataShift(f). For example, the corrector 110 calculates a corrected phase by the following Formula 13. Hereinafter, the corrected phase may be expressed as postPhaseRad (unit: radian).

$$\text{postPhaseRad} = \text{prePhaseRad} + \text{numCycle} \times \text{deltaD} \quad \text{(Formula 13)}$$

As S1105, the corrector 110 performs amplitude correction according to the shifted frequency interval number numCycle on the amplitude preAmpldB of the frequency-shifted frequency domain signal fftDataShift(f). For example, the corrector 110 calculates corrected amplitude by the following Formula 14. Hereinafter, the corrected amplitude may be expressed as postAmpldB (unit: dBV).

$$\text{postAmpldB} = \text{preAmpldB} + \text{numCycle} \times \text{GdB} \quad \text{(Formula 14)}$$

As S1106, the corrector 110 converts a unit system of the corrected amplitude into an antilogarithm unit system (that is, V (volt)). For example, the corrector 110 calculates an antilogarithm unit system value (unit: V) of the corrected amplitude by the following Formula 15. Hereinafter, the antilogarithm unit system value of the corrected amplitude may be expressed as postAmpl.

$$\text{postAmpl} = 10^{\wedge}(\text{postAmpldB}/20) \quad \text{(Formula 15)}$$

As S1107, the corrector 110 calculates a corrected signal voltage by the following Formula 16. Hereinafter, the corrected signal voltage corresponds to the postFftDataShift(f).

$$\text{postFftDataShift}(f) = \text{postAmpl} \times (\cos(\text{postPhaseRad}) + j \times \sin(\text{postPhaseRad})) \quad \text{(Formula 16)}$$

Here, j is an imaginary unit.

As S1108, the corrector 110 determines whether the frequency f is an upper limit frequency of the total signal bandwidth BWtotal.

When it is determined that the frequency f is not the upper limit frequency of the total signal bandwidth BWtotal (S1108: NO), as S1109, the corrector 110 increases the frequency f by the unit frequency unitF of the frequency domain signal fftDataShift(f), and returns to the process of S1102.

When it is determined that the frequency f is the upper limit frequency of the total signal bandwidth BWtotal (S1108: YES), correction is completed for all frequency domains of the fftDataShift(f), and thus the corrector 110 outputs the corrected frequency domain signal as S1110. The corrected frequency domain signal corresponds to the postFftDataShift(f).

Through the above processing, the corrector 110 can calculate the corrected frequency domain signal postFftDataShift(f).

Figure 29:
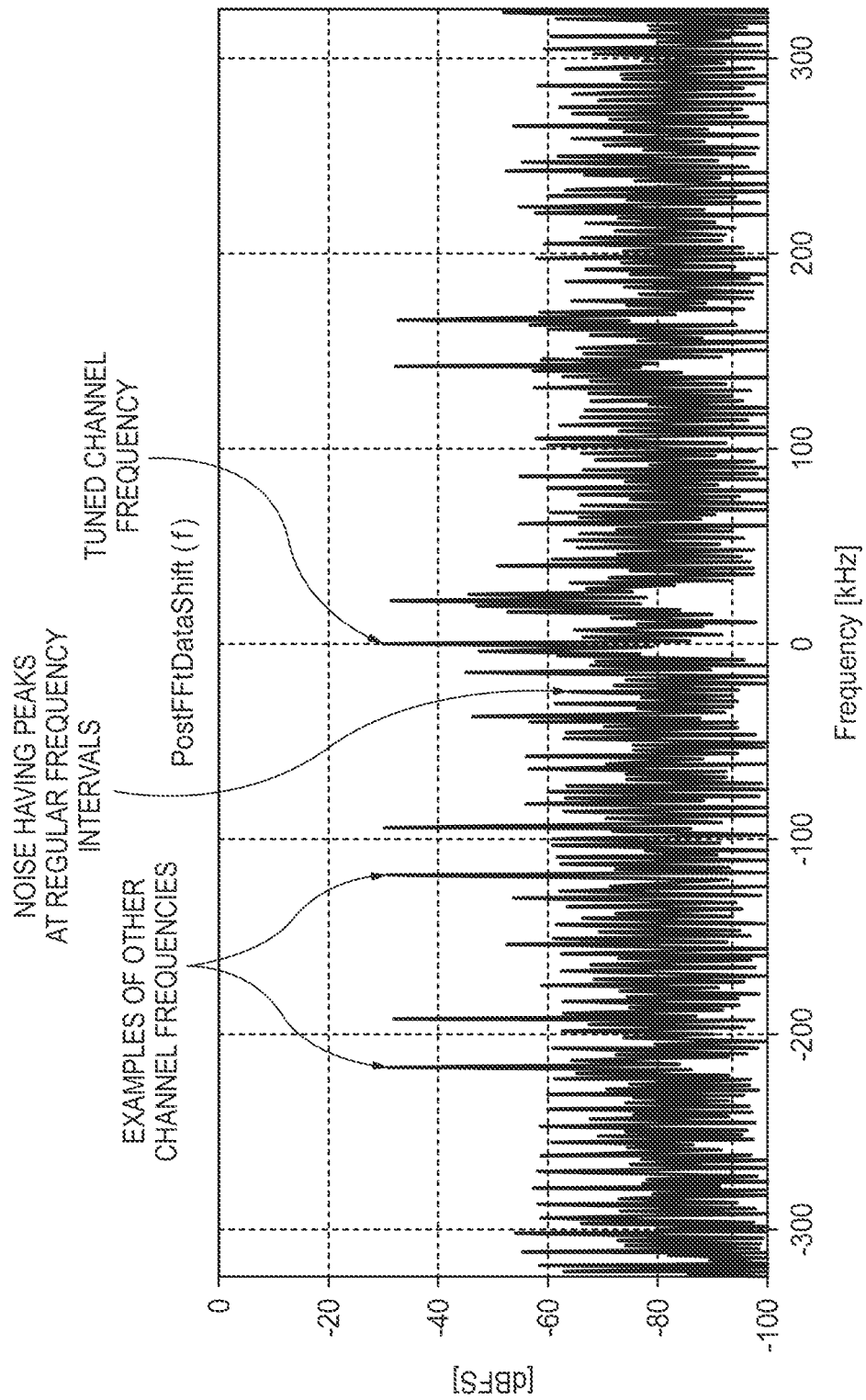
FIG. 29 shows an example of a frequency spectrum of an output signal output from a noise canceller according to Embodiment 1.

The corrected frequency domain signal postFftDataShift (f) output by the corrector 110 is converted into the noise time domain signal noiseSig(t) by the second converter 111. The noise canceller 113 subtracts the noise time domain signal noiseSig(t) from the input time domain signal inSig(t) output from the delay device 112, and outputs the output signal outSig(t). outSig(t) is a time domain signal, and FIG. 29 shows a result of acquiring a frequency spectrum thereof. In addition, Table 1 shows an example of a result of comparing the input frequency domain signal fftData(f) corresponding to a frequency spectrum of the input time domain signal inSig(t) and the frequency spectrum of the outSig(t), as shown in FIG. 3.

TABLE 1

|  | INPUT SIGNAL inSig(t) (FIG. 3) | OUTPUT SIGNAL outSig(t) (FIG. 29) | DIFFERENCE |
|---|---|---|---|
| TUNED CHANNEL FREQUENCY AMPLITUDE | −30 dBFS | −30 dBFS | 0 dB |
| NOISE PEAK AMPLITUDE (AT FREQUENCY NEAR TUNED CHANNEL FREQUENCY) | −50 dBFS | −68 dBFS | LOWERED BY 18 dB |

The amplitude of the broadcast electric signal at the tuned channel frequency is −30 dBFS for both the input signal and the output signal, and is substantially not attenuated by the signal processing of the present disclosure. Meanwhile, amplitude of a noise peak having a periodic spectrum pattern on a frequency axis is −50 dBFS in the input signal and −68 dBFS in the output signal at a frequency near the tuned channel frequency. Therefore, it is confirmed that the signal processing method of the present disclosure has an effect of attenuating noise signal amplitude without attenuating the selected frequency signal amplitude. Therefore, for example, when a tuned channel broadcast signal is demodulated, volume of noise included in a sound is lowered, and thus a sound of a broadcast electromagnetic wave can be easily heard.

Embodiment 2

Next, Embodiment 2 will be described. In the description of Embodiment 2, the contents already described in Embodiment 1 may be omitted.

<Configuration of Signal Processing Device>

Figure 30:
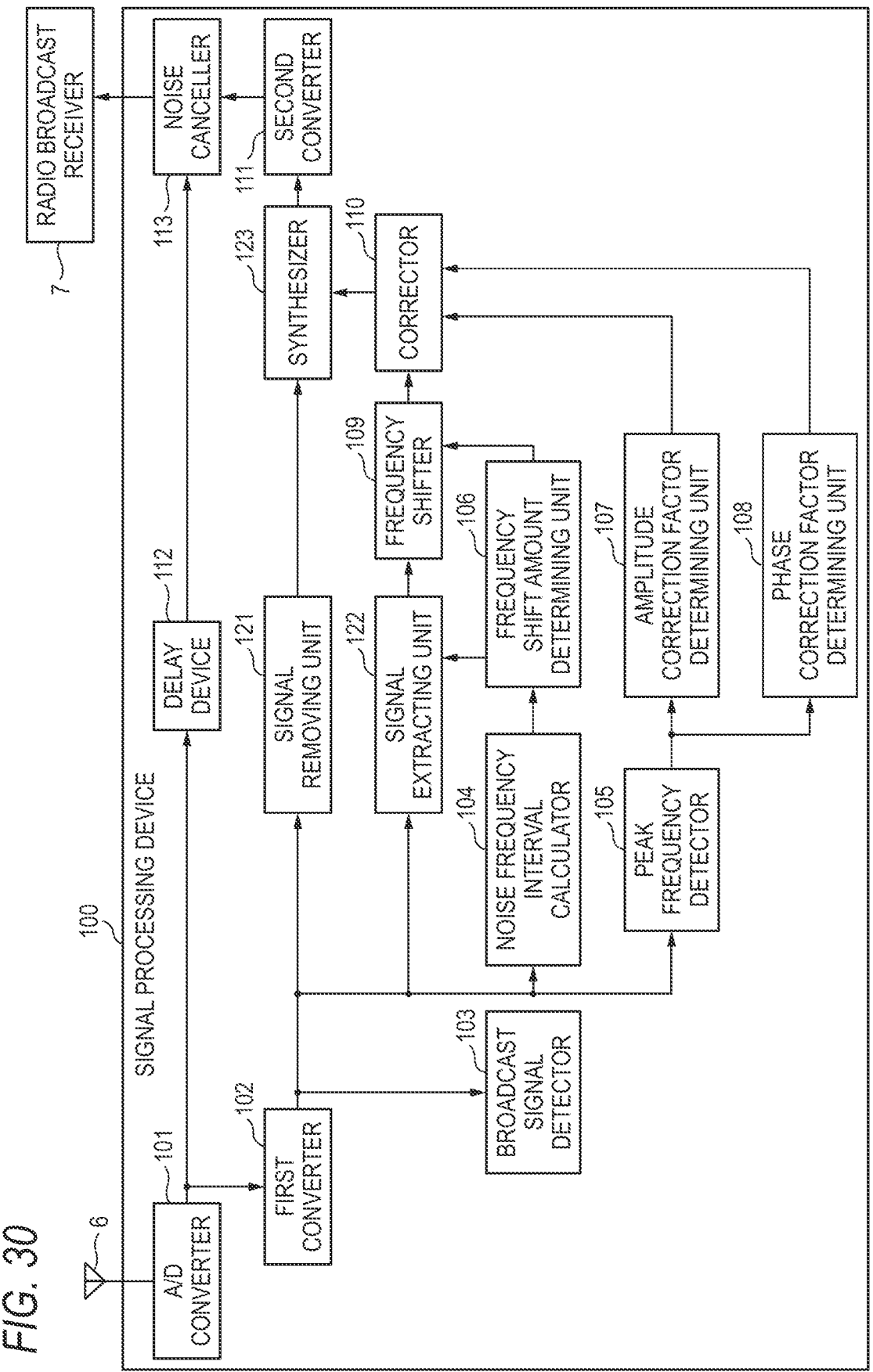
FIG. 30 is a block diagram showing an example of a configuration of a signal processing device according to Embodiment 2.

FIG. 30 is a block diagram showing an example of a configuration of the signal processing device 100 according to Embodiment 2.

The signal processing device 100 includes: the A/D converter 101; the first converter 102; the broadcast signal detector 103; the noise frequency interval calculator 104; the peak frequency detector 105; the frequency shift amount determining unit 106; the amplitude correction factor determining unit 107; the phase correction factor determining unit 108; the frequency shifter 109; the corrector 110; the second converter 111; the delay device 112; the noise canceller 113; a signal removing unit 121; a signal extracting unit 122; and a synthesizer 123.

The A/D converter 101, the first converter 102, the broadcast signal detector 103, the noise frequency interval calculator 104, the peak frequency detector 105, the frequency shift amount determining unit 106, the amplitude correction factor determining unit 107, and the phase correction factor determining unit 108 are the same as those in Embodiment 1, and thus description thereof will be omitted.

The signal removing unit 121 removes a signal in the tuned channel frequency range from the input frequency domain signal fftData(f) input from the first converter 102. Hereinafter, a signal obtained by removing the signal in the tuned channel frequency range from the input frequency domain signal fftData(f) may be expressed as fftDataWoRec (f). The signal removing unit 121 outputs the fftDataWoRec (f) to the synthesizer 123. Details of processing of the signal removing unit 121 will be described later.

The signal extracting unit 122 calculates a frequency range B2 that overlaps the tuned channel frequency range of fftData(f) after a frequency shift using the frequency shift amount fShift. Then, a signal in the frequency range B2 is extracted from the input frequency domain signal fftData(f) input from the first converter 102. The signal extracting unit 122 outputs the signal in the frequency range B2 to the frequency shifter 109. Details of processing of the signal extracting unit 122 will be described later.

The frequency shifter 109 shifts a frequency of the signal in the frequency range B2 input from the signal extracting unit 122 by the frequency shift amount fShift input from the frequency shift amount determining unit 106. Hereinafter, a signal obtained by shifting the frequency of the signal in the frequency range B2 may be expressed as fftDataShiftOfRec (f). The frequency shifter 109 outputs the fftDataShiftOfRec (f) to the corrector 110. Details of processing of the frequency shifter 109 will be described later.

The corrector 110 corrects amplitude and phase of the fftDataShiftOfRec(f) in the same manner as in Embodiment 1. Hereinafter, a signal obtained by correcting the amplitude and the phase of the fftDataShiftOfRec(f) may be expressed as postFftDataShiftOfRec(f). The corrector 110 outputs the postFftDataShiftOfRec(f) to the synthesizer 123. Details of processing of the corrector 110 will be described later.

The synthesizer 123 performs signal synthesis by which the postFftDataShiftOfRec(f) input from the corrector 110 is added to the fftDataWoRec(f) input from the signal removing unit 121. A signal obtained by adding the postFftDataShiftOfRec(f) to the fftDataWoRec(f) corresponds to the postFftDataShift(f) in Embodiment 1. The synthesizer 123 outputs the postFftDataShift(f) to the second converter 111.

<Outline of Processing of Signal Processing Device>

Figure 31:
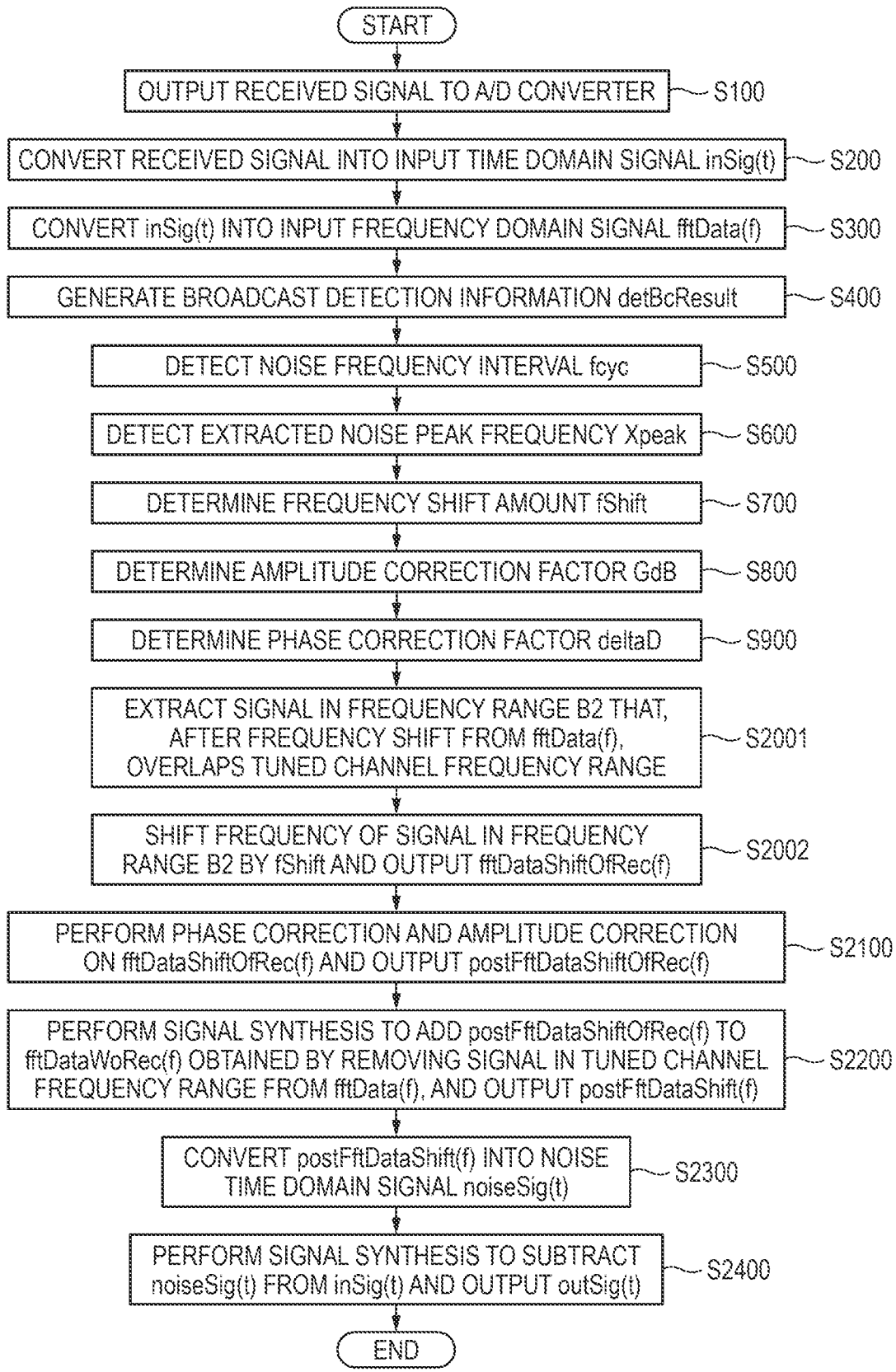
FIG. 31 is a flowchart showing an outline of processing of the signal processing device according to Embodiment 2.

FIG. 31 is a flowchart showing an outline of processing of the signal processing device 100 according to Embodiment 2. FIG. 32 shows the frequency range B2 that falls within the tuned channel frequency range after the frequency shift.

The signal processing device 100 performs the same processes as S100 to S900 shown in FIG. 4.

As S2001, the signal extracting unit 122 extracts the signal in the frequency range B2 that overlaps the tuned channel frequency range after the frequency shift from the input frequency domain signal fftData(f). Details of the process 2001 will be described later.

As S2002, the frequency shifter 109 shifts the frequency of the signal in the frequency range B2 extracted in S2001 by the frequency shift amount fShift and outputs the fftDataShiftOfRec(f). Details of the process of S2002 will be described later.

As S2100, the corrector 110 performs amplitude correction and phase correction on the fftDataShiftOfRec(f), and outputs the postFftDataShiftOfRec(f). Details of the process of S2100 will be described later.

As S2200, the synthesizer 123 performs a signal synthesis by which the postFftDataShiftOfRec(f) is added to the fftDataWoRec(f), and outputs the postFftDataShift(f).

As S2300, the second converter 111 converts the postFftDataShift(f) into the noise time domain signal noiseSig(t).

As S2400, the noise canceller 113 performs a signal synthesis by which the noise time domain signal noiseSig(t) is subtracted from the input time domain signal inSig(t), and outputs the output signal outSig(t).

As a result, the signal processing device 100 can output the outSig(t) in which noise is cancelled in the tuned channel frequency range.

<Details of Processing of Signal Extracting Unit and Frequency Shifter>

Figure 33:
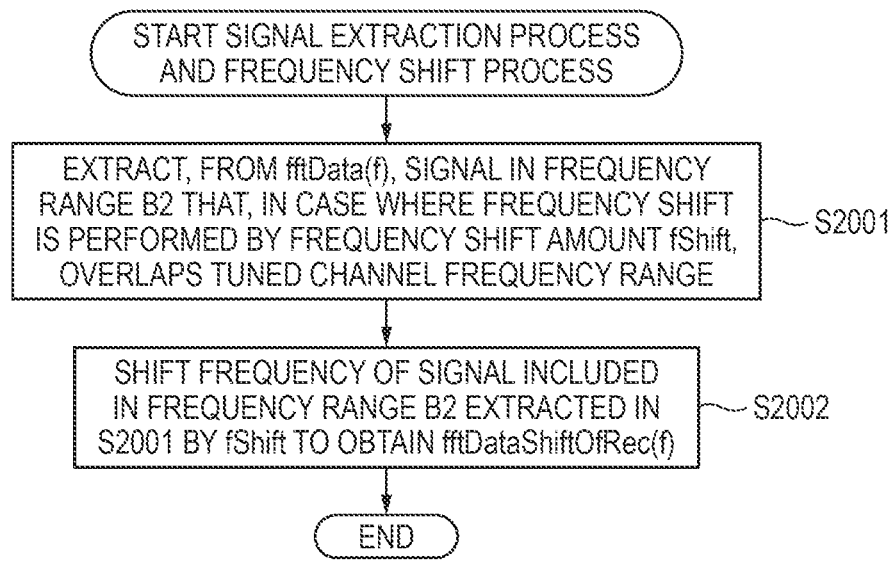
FIG. 33 is a flowchart showing an example of processing of a signal extracting unit and a frequency shifter according to Embodiment 2.

Next, the processing of the signal extracting unit 122 and the frequency shifter 109 will be described in detail. That is, the processes of S2001 and S2002 shown in FIG. 31 will be described in detail. FIG. 33 is a flowchart showing an example of the processing of the signal extracting unit 122 and the frequency shifter 109.

As S2001, when the frequency shift by the frequency shift amount fShift is performed, the signal extracting unit 122 extracts the signal in the frequency range B2 that overlaps the tuned channel frequency range from the input frequency domain signal fftData(f). For example, when the tuned channel frequency range is (−sigRange/2 to +sigRange/2), the signal extracting unit 122 calculates the frequency range B2 as ((−fShift−sigRange/2) to (−fShift+sigRange/2)). Then, the signal extracting unit 122 extracts the signal included in the frequency range B2 from the fftData(f). Here, "extracting a signal" may mean that information on a frequency and a voltage (amplitude and phase) of a signal within a predetermined frequency range is left while information on a frequency and a voltage of a signal whose frequency is outside the predetermined frequency range is removed.

As S2002, the frequency shifter 109 shifts the frequency of the signal included in the frequency range B2 extracted in S2001 by the frequency shift amount fShift, and outputs the fftDataShiftOfRec(f). A frequency range of the fftDataShiftOfRec(f) may be the same as the tuned channel frequency range, which is (−sigRange/2 to +sigRange/2).

<Details of Processing of Corrector>

Figure 34:
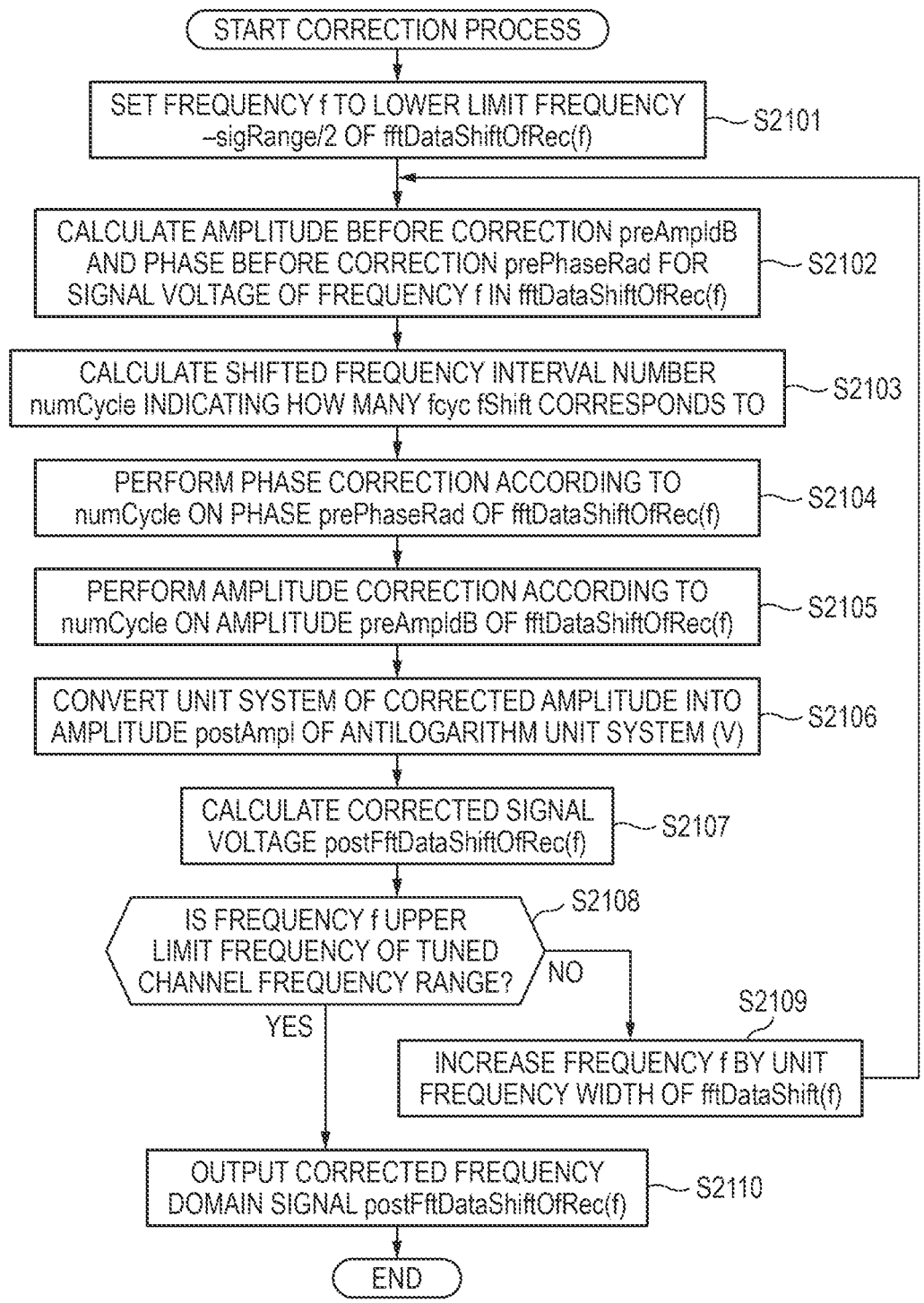
FIG. 34 is a flowchart showing an example of processing of a corrector according to Embodiment 2.
Figure 35:
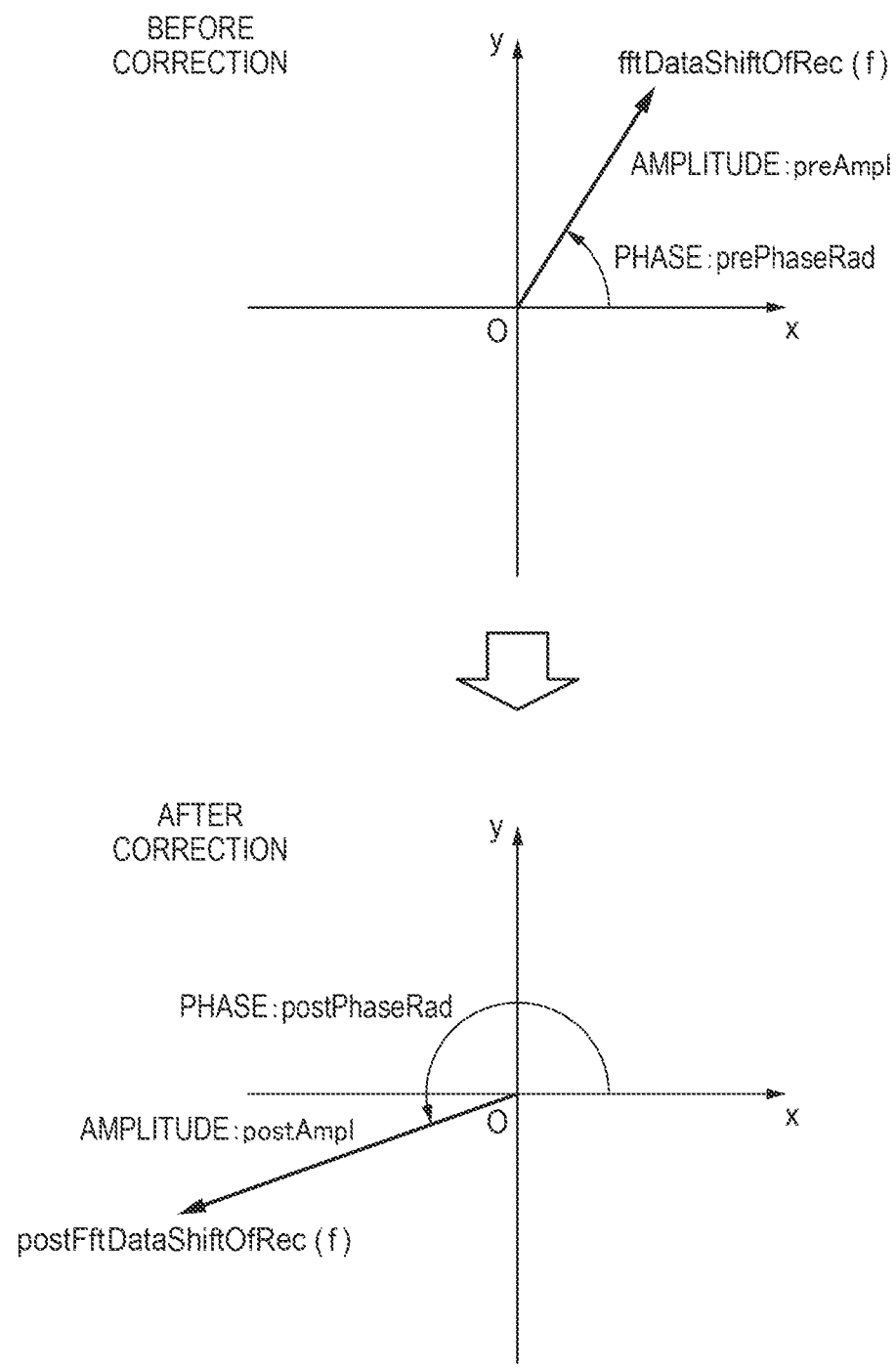
FIG. 35 shows amplitude correction and phase correction according to Embodiment 2.

Next, the processing of the corrector 110 will be described in detail. That is, the process of S2100 shown in FIG. 31 will be described in detail. FIG. 34 is a flowchart showing an example of the processing of the corrector 110 according to Embodiment 2. FIG. 35 shows amplitude correction and phase correction according to Embodiment 2.

As S2101 to 52106, the corrector 110 performs a process in which the fftDataShift(f) in S1101 to S1106 shown in FIG. 27 is replaced with the fftDataShiftOfRec(f).

As S2107, the corrector 110 calculates the corrected signal voltage postFftDataShiftOfRec(f) by the following Formula 17.

$$\text{postFftDataShiftOfRec}(f) = \text{postAmpl} \times (\cos(\text{postPhaseRad}) + j \times \sin(\text{postPhaseRad})) \quad \text{(Formula 17)}$$

Then, as S2108, the corrector 110 determines whether the frequency f is an upper limit frequency of the tuned channel frequency range.

When the frequency f is not the upper limit frequency of the tuned channel frequency range (S2108: NO), as S2109, the corrector 110 increases the frequency f by a unit frequency width of the frequency domain signal fftDataShiftOfRec(f), and returns to the process of S2102.

When the frequency f is the upper limit frequency of the tuned channel frequency range (S2108: YES), the corrector 110 outputs the postFftDataShiftOfRec(f), which is the corrected frequency domain signal, as S2110.

Through the above processing, the corrector 110 can output the postFftDataShiftOfRec(f) that is a signal obtained by correcting the amplitude and the phase of the fftDataShiftOfRec(f).

<Details of Processing of Signal Removing Unit and Synthesizer>

Figure 36:
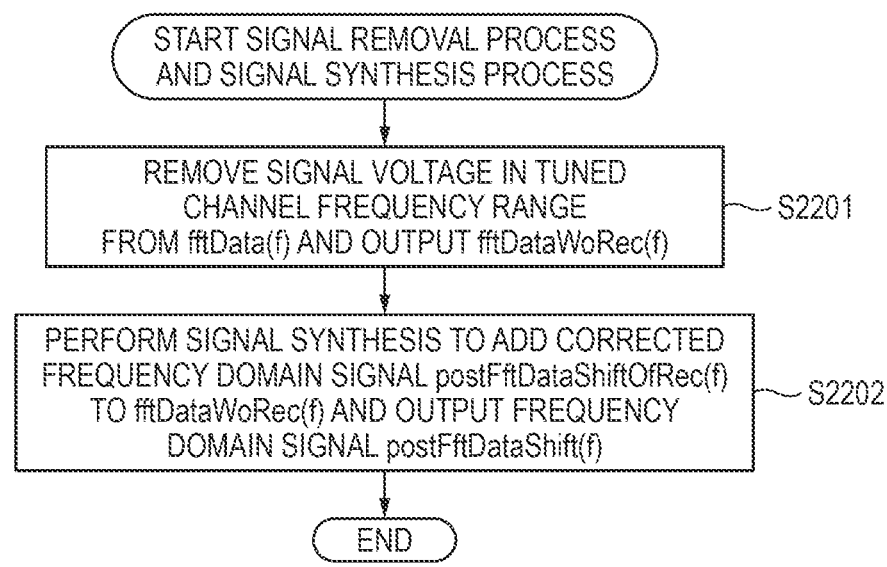
FIG. 36 is a flowchart showing an example of processing of a signal removing unit and a synthesizer according to Embodiment 2.
Figure 37:
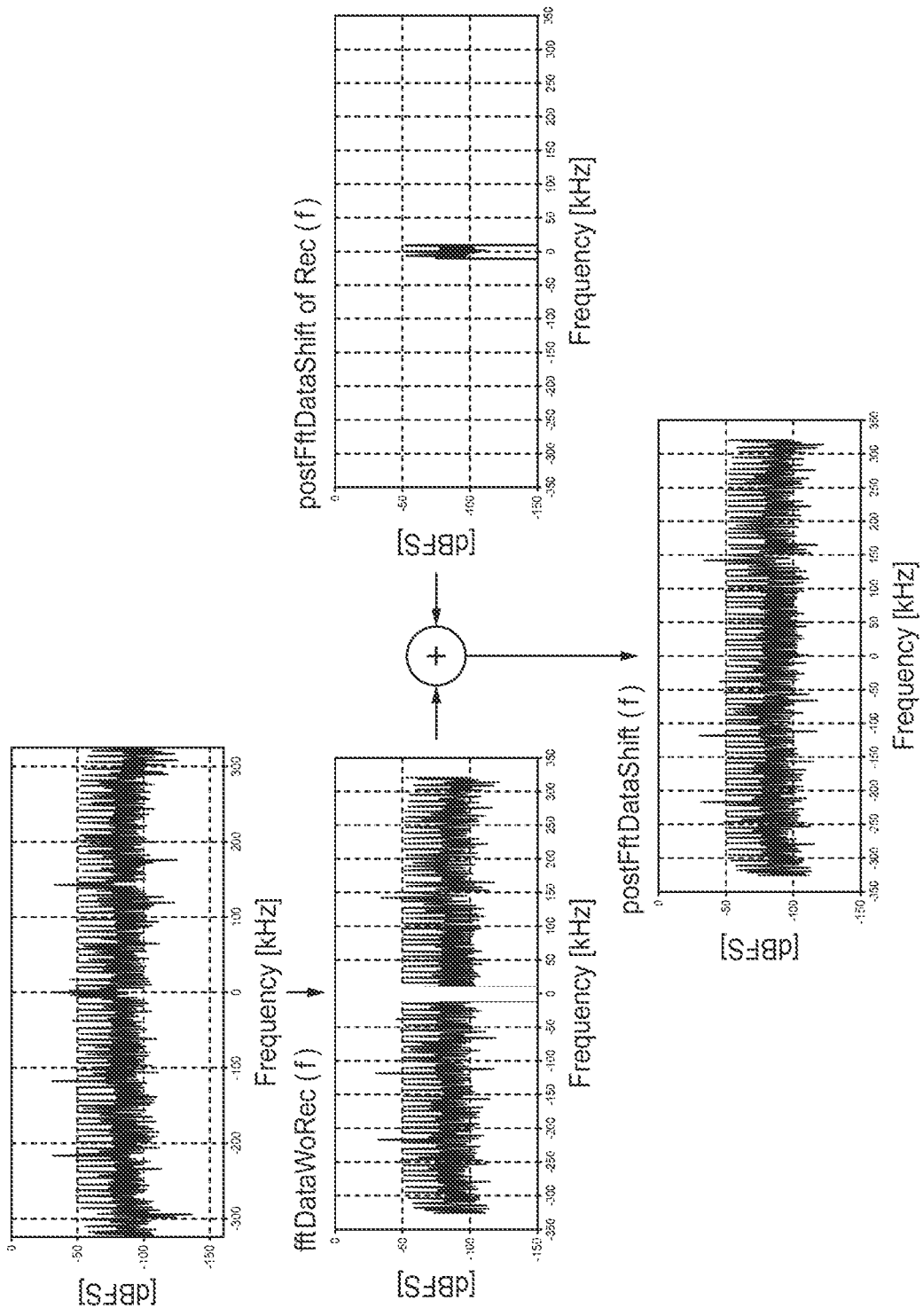
FIG. 37 shows a signal synthesis of the synthesizer according to Embodiment 2.

Next, the processing of the signal removing unit 121 and the synthesizer 123 will be described in detail. That is, the process of S2200 shown in FIG. 31 will be described in detail. FIG. 36 is a flowchart showing an example of the processing of the signal removing unit 121 and the synthesizer 123 according to Embodiment 2. FIG. 37 shows the signal synthesis of the synthesizer 123 according to Embodiment 2.

As S2201, as shown in FIG. 37, the signal removing unit 121 removes a signal voltage in the tuned channel frequency range from the input frequency domain signal fftData(f), and outputs the frequency domain signal fftDataWoRec(f). The signal voltage in the tuned channel frequency range (−sigRange/2 to +sigRange/2) of fftDataWoRec(f) is 0.

As S2202, as shown in FIG. 37, the synthesizer 123 performs the signal synthesis by which the postFftDataShiftOfRec(f) is added to the fftDataWoRec(f), and outputs the frequency domain signal postFftDataShift(f).

Through the above processing, the synthesizer 123 can output the frequency domain signal postFftDataShift(f) that does not include any tuned channel broadcast signal. That is, signals in the tuned channel frequency range in the postFftDataShift(f) are mainly noise signals. Therefore, as in the case of Embodiment 1, the noise canceller 113 can remove noise in the tuned channel frequency range.

According to Embodiment 2, since processing of the frequency shift and the correction of amplitude and phase is limited to be within the tuned channel frequency range, an amount of computation can be reduced as compared with Embodiment 1. In addition, according to Embodiment 2, a reduction amount of noise voltages outside the tuned channel frequency range is usually larger as compared with Embodiment 1.

In Embodiment 1, in order to shift the frequency of the input frequency domain signal fftData(f) as a whole, for example, a signal voltage of a freed frequency in a low frequency band is set to 0. Therefore, in Embodiment 1, noise in the low frequency band in which the signal voltage is set to 0 is not reduced in the signal synthesis of the noise canceller 113. On the other hand, in Embodiment 2, the signal voltage of the frequency in the low frequency band is not 0. Therefore, in Embodiment 2, the noise in the low frequency band is also reduced in the signal synthesis of the noise canceller 113.

(Hardware Configuration)

Figure 38:
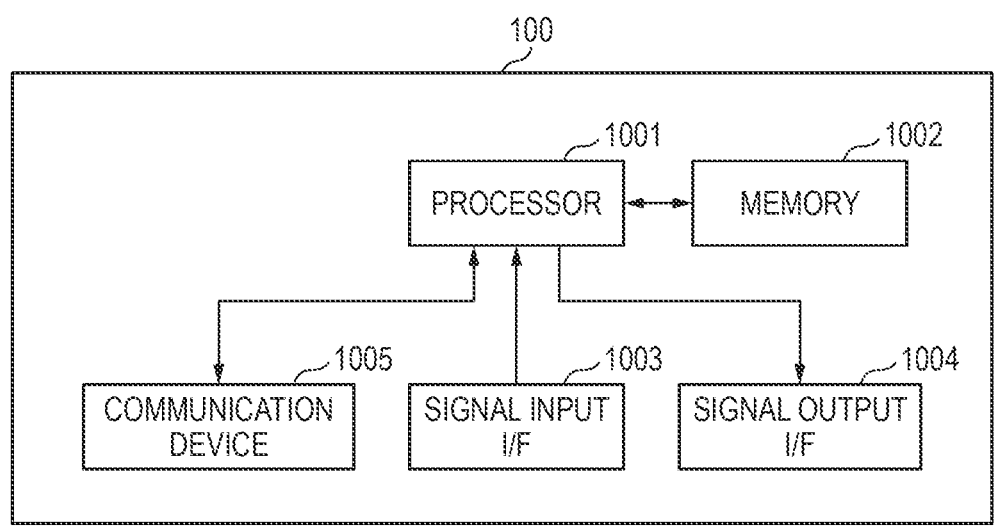
FIG. 38 is a block diagram showing an example of a hardware configuration of the signal processing device according to the present disclosure.

FIG. 38 is a block diagram showing an example of a hardware configuration of the signal processing device 100 according to the present disclosure.

As shown in FIG. 38, the signal processing device 100 may include a processor 1001, a memory 1002, a signal input interface (I/F) 1003, a signal output I/F 1004, and a communication device 1005.

The processor 1001 may execute a computer program stored in the memory 1002 so as to implement processes of blocks 101 to 113 and 121 to 123 included in the signal processing device 100 described above. The processor 1001 may be replaced with other terms such as a control unit, a control device, a control circuit, a controller, a central processing unit (CPU), a micro processing unit (MPU), a large scale integration (LSI), an application specific integrated circuit (ASIC), a programmable logic device (PLD), and a field-programmable gate array (FPGA).

The memory 1002 stores computer programs and data handled by the signal processing device 100. The memory 1002 may include a read-only memory (ROM) and a random access memory (RAM). In addition, the memory 1002 may include a volatile memory and a non-volatile memory.

The signal input I/F 1003 may be connected to the antenna 6. The signal input I/F 1003 may output the received signal input from the antenna 6 to the processor 1001.

The signal output I/F 1004 may be connected to the radio receiver 7. The signal output I/F 1004 may output the output signal input from the processor 1001 to the radio receiver 7.

The communication device 1005 may be connected to a communication network in the vehicle 1. Examples of the communication network include a controller area network (CAN), LIN, and Flex Ray. The processor 1001 may transmit and receive information to and from each device included in the vehicle 1 through the communication device 1005 and the communication network.

It should be noted that at least a part of the blocks 101 to 113 and 121 to 123 of the signal processing device 100 may be implemented as an LSI that is an integrated circuit. The blocks 101 to 123 may each be formed into one chip, or may be formed into one chip that includes a part or all of the blocks 101 to 123. Here, the term LSI may also be referred to as an IC, a system LSI, a super LSI, or an ultra LSI depending on a degree of integration. Further, if an integrated circuit technology that replaces the LSI emerges due to a progress of a semiconductor technology or another derivative technology, the technology may naturally be used to integrate the blocks.

Although the embodiments have been described with reference to the accompanying drawings, the present disclosure is not limited thereto. It will be apparent to those skilled in the art that various modifications, corrections, substitutions, additions, removes, and equivalents can be conceived within the scope described in the claims, and it is to be understood that such modifications, corrections, substitutions, additions, removes, and equivalents also fall within the technical scope of the present disclosure. In addition, the constituent elements in the above-described embodiments may be combined as desired within a range not departing from the spirit of the invention.

The technology of the present disclosure is useful for removing noise included in a signal received by an antenna.

This application is based on Japanese Patent Application No. 2021-030458 filed on Feb. 26, 2021, the entire contents of which are incorporated herein by reference.

The invention claimed is:

1. A signal processing device comprising:
a processor; and
a memory having instructions that, when executed by the processor, cause the signal processing device to perform operations comprising:
converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in the frequency domain;
calculating a frequency interval between the peaks of the noise in the frequency domain based on a correlation of the second signal;
determining a frequency shift amount in the frequency domain based on the frequency interval; and
shifting a frequency of the second signal by the frequency shift amount to create a frequency-shifted signal.

2. The signal processing device according to claim 1, wherein the operations further comprise:
correcting phases of the peaks of the frequency-shifted signal to create a corrected signal.

3. The signal processing device according to claim 2, wherein the corrected signal is created using a phase correction factor corresponding to a phase difference between two adjacent peaks of the noise.

4. The signal processing device according to claim 2, wherein the operations further comprise:
    correcting amplitude of the peaks of the frequency-shifted signal to create the corrected signal.

5. The signal processing device according to claim 4, wherein the corrected signal is created using an amplitude correction factor corresponding to an amplitude difference or a ratio of amplitude between two adjacent peaks of the noise.

6. The signal processing device according to claim 2, wherein the operations further comprise:
    converting the corrected signal into a third signal that is a time domain signal; and
    performing a signal synthesis to subtract the third signal from the first signal.

7. The signal processing device according to claim 1, wherein the frequency shift amount is a multiple of the frequency interval between the peaks.

8. The signal processing device according to claim 1, wherein the frequency shift amount is larger than a frequency bandwidth occupied by a tuned broadcast station.

9. The signal processing device according to claim 1, wherein the frequency shift amount is determined such that a frequency range including the broadcast electric signal in the frequency-shifted signal does not overlap the frequency range of a signal of a tuned broadcast station.

10. A signal processing device comprising:
a processor; and
a memory having instructions that, when executed by the processor, cause the signal processing device to perform operations comprising:
    converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in the frequency domain;
    calculating a frequency interval between the peaks of the noise in the frequency domain based on a correlation of the second signal;
    determining a frequency shift amount in the frequency domain based on the frequency interval;
    extracting a signal from the second signal as a third signal in a frequency range, in a case in which the frequency of the second signal is shifted by the frequency shift amount, overlapping a frequency range of a signal of a tuned broadcast station; and
    shifting a frequency of the third signal by the frequency shift amount to create a frequency-shifted signal.

11. The signal processing device according to claim 10, wherein the operations further comprise:
    correcting phases of the peaks of the frequency-shifted signal to create a corrected signal.

12. The signal processing device according to claim 11, wherein the corrected signal is created using a phase correction factor corresponding to a phase difference between two adjacent peaks of the noise.

13. The signal processing device according to claim 11, wherein the operations further comprise:
    correcting amplitude of the peaks of the frequency-shifted signal to create the corrected signal.

14. The signal processing device according to claim 13, wherein the corrected signal is created using an amplitude correction factor corresponding to an amplitude difference or a ratio of amplitude between two adjacent peaks of the noise.

15. The signal processing device according to claim 11, wherein the operations further comprise:
    removing, from the second signal, a signal at a frequency range of the tuned broadcast station to create a fourth signal;
    performing a first signal synthesis to add a fifth signal that is the corrected signal to the fourth signal to create a synthesized signal;
    converting the synthesized signal into a sixth signal that is a time domain signal; and
    performing a second signal synthesis to subtract the sixth signal from the first signal.

16. The signal processing device according to claim 10, wherein the frequency shift amount is a multiple of the frequency interval between the peaks.

17. The signal processing device according to claim 10, wherein the frequency shift amount is larger than a frequency bandwidth occupied by the tuned broadcast station.

18. The signal processing device according to claim 10, wherein the frequency shift amount is determined such that a frequency range including the broadcast electric signal in the frequency-shifted signal does not overlap the frequency range of the signal of the tuned broadcast station.

19. A signal processing method comprising:
converting a first signal that is a time domain signal into a second signal that is a frequency domain signal in response to reception of the first signal, the first signal containing noise superimposed on a broadcast electric signal derived from a broadcast electromagnetic wave, the noise having peaks of amplitude at regular frequency intervals in the frequency domain;
calculating a frequency interval between the peaks of the noise in the frequency domain based on a correlation of the second signal;
determining a frequency shift amount in the frequency domain based on the frequency interval;
extracting a signal from the second signal as a third signal in a frequency range, in a case in which the frequency of the second signal is shifted by the frequency shift amount, overlapping a frequency range of a signal of a tuned broadcast station; and
shifting a frequency of the third signal by the frequency shift amount.

* * * * *